United States Patent
Yoshizumi

(10) Patent No.: US 8,786,722 B2
(45) Date of Patent: Jul. 22, 2014

(54) COMPOSITION CONTROL DEVICE, IMAGING SYSTEM, COMPOSITION CONTROL METHOD, AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 12/813,039

(22) Filed: Jun. 10, 2010

(65) Prior Publication Data

US 2011/0019012 A1 Jan. 27, 2011

(30) Foreign Application Priority Data

Jul. 27, 2009 (JP) ................. 2009-174575

(51) Int. Cl.
*H04N 5/228* (2006.01)
*H04N 5/225* (2006.01)
*H04N 5/232* (2006.01)
*H04N 9/04* (2006.01)

(52) U.S. Cl.
CPC .......... *H04N 5/23216* (2013.01); *H04N 9/045* (2013.01)
USPC ...................... 348/222.1; 348/169; 348/240.2

(58) Field of Classification Search
CPC ..... G01S 3/7864; G01S 3/7865; H04N 5/232; H04N 2101/00; H04N 2201/0084; H04N 5/23296; H04N 5/2628; H04N 9/045; H04N 5/23216
USPC ......... 348/222.1, 169, 207.99, 207.1, 240.99, 348/240.2; 382/103
See application file for complete search history.

(56) References Cited

U.S. PATENT DOCUMENTS 8,594,390 B2 * 11/2013 Yoshizumi ..................... 382/118
8,605,158 B2 * 12/2013 Yoshizumi ................. 348/207.1
8,638,372 B2 * 1/2014 Yoshizumi ................. 348/211.9

(Continued)

FOREIGN PATENT DOCUMENTS

JP 2009-100300 5/2009

OTHER PUBLICATIONS

U.S. Appl. No. 13/383,450, filed Jan. 11, 2012, Yoshizumi.
U.S. Appl. No. 13/384,898, filed Jan. 19, 2012, Yoshizumi.

(Continued)

*Primary Examiner* — Aung S Moe
(74) *Attorney, Agent, or Firm* — Oblon, Spivak, McClelland, Maier & Neustadt, L.L.P.

(57) ABSTRACT

A composition control device includes: a composition determination unit which determines a target composition, the composition determination unit determining zoom magnification and a target position of the subject in an image region; a preliminary position obtaining unit which obtains, as a preliminary position, a position of the subject, before a field angle is changed according to the zoom magnification, in a case where the target position is obtained; a movable mechanism section control unit which performs a control for a movable mechanism section which changes an imaging view range of the imaging section so that the position of the subject corresponds to the obtained preliminary position; and a zoom control unit which performs a driving control for a zoom lens of the imaging section so that the field angle is obtained according to the zoom magnification after the image region of the subject is disposed in the preliminary position.

10 Claims, 21 Drawing Sheets

(56) References Cited

U.S. PATENT DOCUMENTS

| | | | |
|---|---|---|---|
| 2009/0102942 A1* | 4/2009 | Yoshizumi et al. | 348/222.1 |
| 2009/0103778 A1* | 4/2009 | Yoshizumi et al. | 382/103 |
| 2009/0175501 A1 | 7/2009 | Tahara | |
| 2009/0268943 A1* | 10/2009 | Yoshizumi | 382/103 |
| 2009/0322896 A1* | 12/2009 | Yoshizumi | 348/222.1 |
| 2010/0157075 A1* | 6/2010 | Yoshizumi | 348/211.9 |
| 2011/0019012 A1* | 1/2011 | Yoshizumi | 348/207.99 |
| 2011/0019021 A1* | 1/2011 | Yoshizumi | 348/222.1 |
| 2011/0157394 A1* | 6/2011 | Yoshizumi | 348/222.1 |
| 2011/0157397 A1* | 6/2011 | Yoshizumi | 348/222.1 |
| 2014/0055636 A1* | 2/2014 | Yoshizumi | 348/222.1 |

OTHER PUBLICATIONS

U.S. Appl. No. 13/384,686, filed Jan. 18, 2012, Yoshizumi.
U.S. Appl. No. 14/062,599, filed Oct. 24, 2013, Yoshizumi.

* cited by examiner

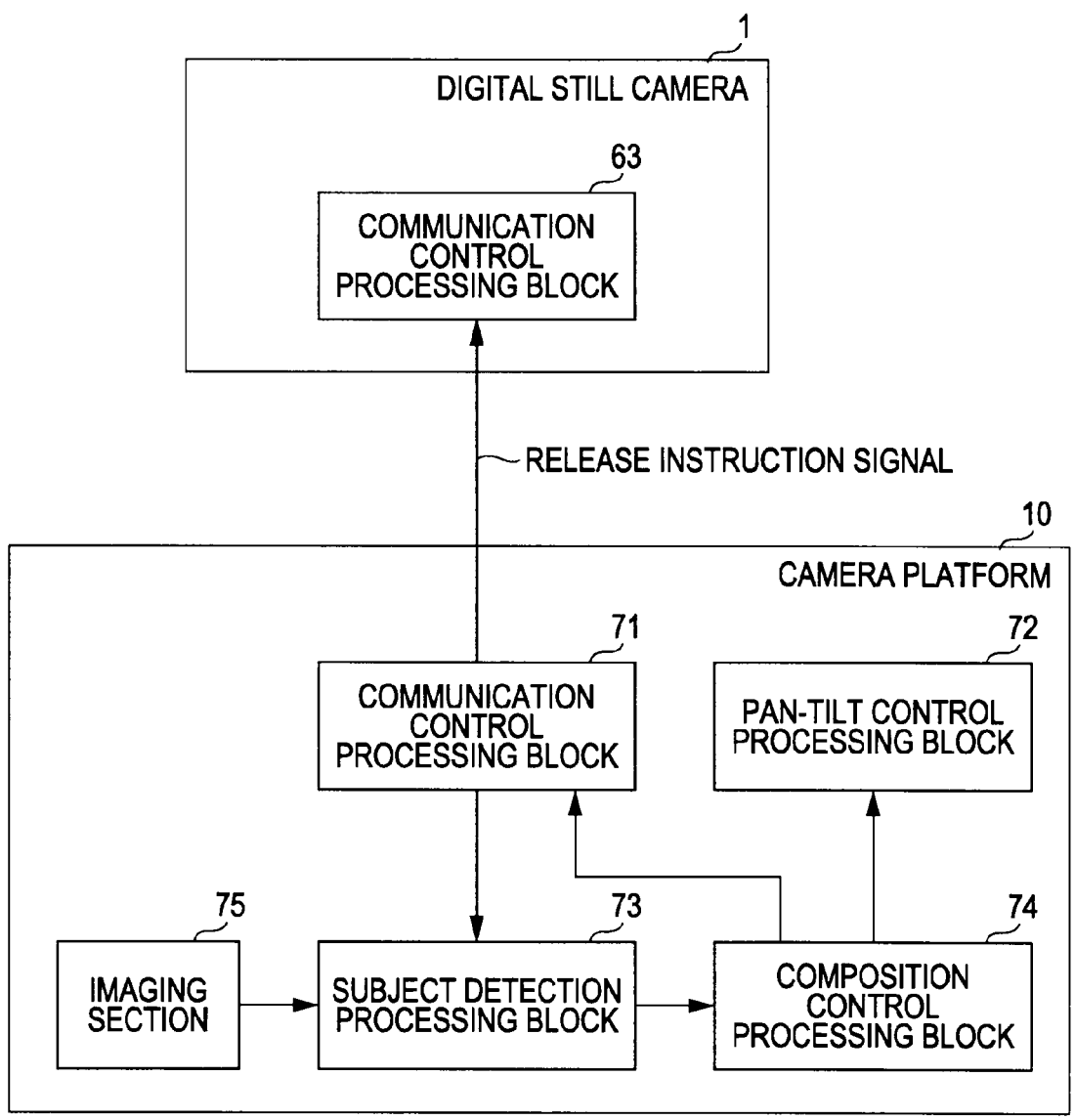

COMPOSITION CONTROL DEVICE, IMAGING SYSTEM, COMPOSITION CONTROL METHOD, AND PROGRAM

BACKGROUND OF THE INVENTION

1. Field of the Invention

The present invention relates to a composition control device and a composition control method which are configured to perform a control for obtaining a desired composition in image contents, for example, using image data as a target. Further, the present invention relates to a program for execution of sequences demanded for the composition control device.

2. Description of the Related Art

The present applicant has proposed a configuration of a composition control disclosed in Japanese Unexamined Patent Application Publication No. 2009-100300. Here, a subject which is present in an image of image data captured by an imaging device is detected, and then, an optimal composition is determined according to the number of detected subjects, the relationship between the face directions detected for all the detected subjects, and so on. Then, composition framing is performed by a pan and tilt control of a camera platform on which the imaging device is mounted, and a zoom control of an optical system of the imaging device, and the like, so that image content of the captured image data corresponds to the determined optimal composition.

SUMMARY OF THE INVENTION

The composition framing control for obtaining the composition as determined in the above Japanese Unexamined Patent Application Publication No. 2009-100300 is performed, as an element thereof, using a composition of a driving control of the camera platform in a pan direction or a driving control thereof in a tilt direction and the zoom control, as described above.

Accordingly, it is desirable to provide a technique in which sequences of the above described composition framing control are further improved to more efficiently perform the composition framing control.

According to an embodiment of the present invention, there is provided a composition control device including: composition determination means which is configured to determine a target composition on the basis of information about a subject detected from an image captured and obtained by an imaging section, the composition determination means determining zoom magnification for obtaining the target composition and a target position of the subject in an image region for obtaining the target composition; preliminary position obtaining means which is configured to obtain, as a preliminary position, a position of the subject obtained in the image, before a field angle is changed according to the zoom magnification, in a case where the target position determined by the composition determination means is obtained; movable mechanism section control means which is configured to perform a control for a movable mechanism section which is configured to change an imaging view range of the imaging section so that the position of the subject in the image region corresponds to the obtained preliminary position; and zoom control means which is configured to perform a driving control for a zoom lens of the imaging section so that the field angle is obtained according to the zoom magnification determined by the composition determination means after the image region of the subject is disposed in the preliminary position by means of the movable mechanism section control means.

According to another embodiment of the present invention, there is provided an imaging system including: an imaging device; a movable mechanism device including a mechanism which is movable to change an imaging view range of the imaging device, the imaging system including: composition determination means which is configured to determine a target composition on the basis of information about a subject detected from an image captured and obtained by the imaging device, the composition determination means determining zoom magnification for obtaining the target composition and a target position of the subject in an image region for obtaining the target composition; preliminary position obtaining means which is configured to obtain, as a preliminary position, a position of the subject obtained in the image, before a field angle is changed according to the zoom magnification, in a case where the target position determined by the composition determination means is obtained; movable mechanism device control means which is configured to perform a control for the movable mechanism device so that the position of the subject in the image region corresponds to the obtained preliminary position; and zoom control means which is configured to perform a driving control for a zoom lens of the imaging device so that the field angle is obtained according to the zoom magnification determined by the composition determination means after the image region of the subject is disposed in the preliminary position by means of the movable mechanism device control means.

In the above described configurations, when the field angle which has been changed according to the determined zoom magnification is returned to a field angle before change, the position of the subject which is obtained in the image is obtained as the preliminary position, from image content in which the determined composition is obtained. Then, the movable mechanism section is controlled so that the subject in the image is disposed in the preliminary position. Thereafter, the zoom control is performed according to the determined zoom magnification. Thus, according to the embodiments of the present invention, the determined composition is obtained in a stage where the zoom control is completed.

Accordingly, for example, unnecessary physical movements are prevented in the movable mechanism section control and the zoom control as the composition control, and time until the determined composition is obtained can be shortened, to thereby perform a high efficiency of composition control.

BRIEF DESCRIPTION OF THE DRAWINGS

FIG. 22 is a diagram illustrating a configuration example of another modified example of an imaging system according to an embodiment of the invention.

DESCRIPTION OF THE PREFERRED EMBODIMENTS

Figure 1A:
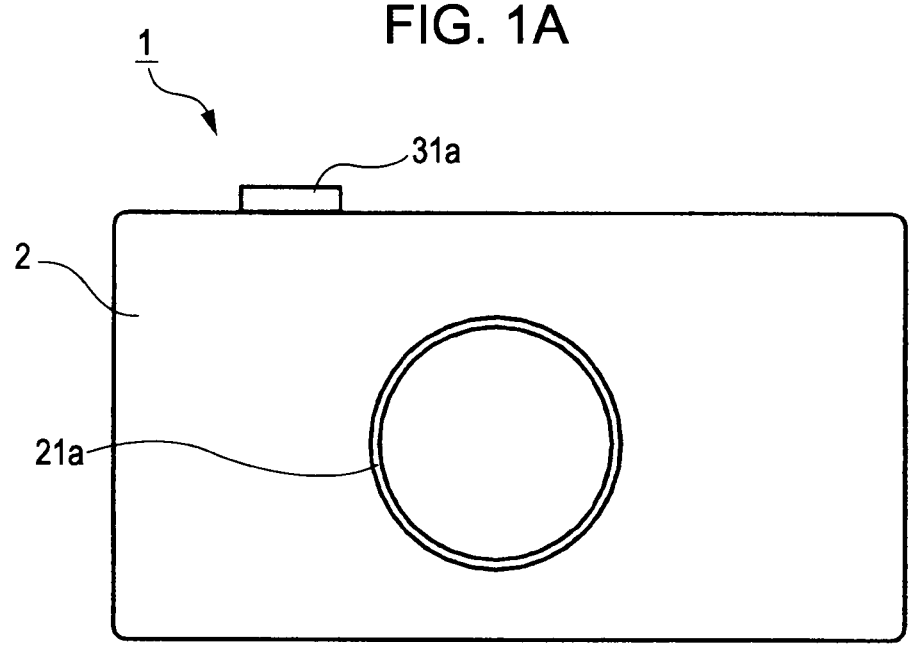
FIGS. 1A and 1B are a front view and a rear view schematically illustrating an appearance of a digital still camera which is an imaging device which forms an imaging system according to an embodiment of the invention.

Hereinafter, embodiments for carrying out the invention will be described in the following order.
1. Configuration of imaging system
1-1. Entire configuration
1-2. Digital still camera
1-3. Camera platform 2. Example of functional configuration corresponding to composition control according to an embodiment
3. Composition control (first example)
4. Composition control (second example)
5. Composition control (third example: an embodiment)
5-1. Example of Algorithm
5-2. Case where the number of subjects is plural
6. Modified examples of imaging system according to an embodiment Hereinafter, the terms "image frame", "field angle", "imaging view range", and "composition" will be used.

The "image frame" refers to a region range corresponding, for example, to a screen in which an image appears, and generally has a rectangular exterior frame shape which is long in the longitudinal or transverse direction.

The "field angle" is also called a zoom angle, and refers to a range of a subject which is collected in the image frame as determined by the position of a zoom lens in an optical system of an imaging device, which is expressed in terms of angle. Generally, the "field angle" is determined by the focal distance of the imaging optical system and the size of a field (imaging sensor or film), but here, refers to a factor element capable of changing according to the focal distance.

The "imaging view range" is determined by an oscillation angle in a panning (horizontal) direction and an angle in a tilting (vertical) direction (elevation angle or depression angle), in addition to the "field angle", with respect to the range of the subject which is collected in the image frame of an image obtained by an imaging process of an imaging device disposed in a predetermined position.

The "composition" is also called "framing", and for example, refers to arrangement including size setting of the subject within the image frame which is determined by the imaging view range.

Hereinafter, an example of the embodiment will be described, in which a configuration according to the embodiment is applied to an imaging system which includes a digital still camera and a camera platform to which the digital still camera is installed.

1. Configuration of Imaging System 1-1. Entire Configuration

An imaging system according to the present embodiment includes a digital still camera 1 and a camera platform 10 on which the digital still camera 1 is installed.

Figure 1B:
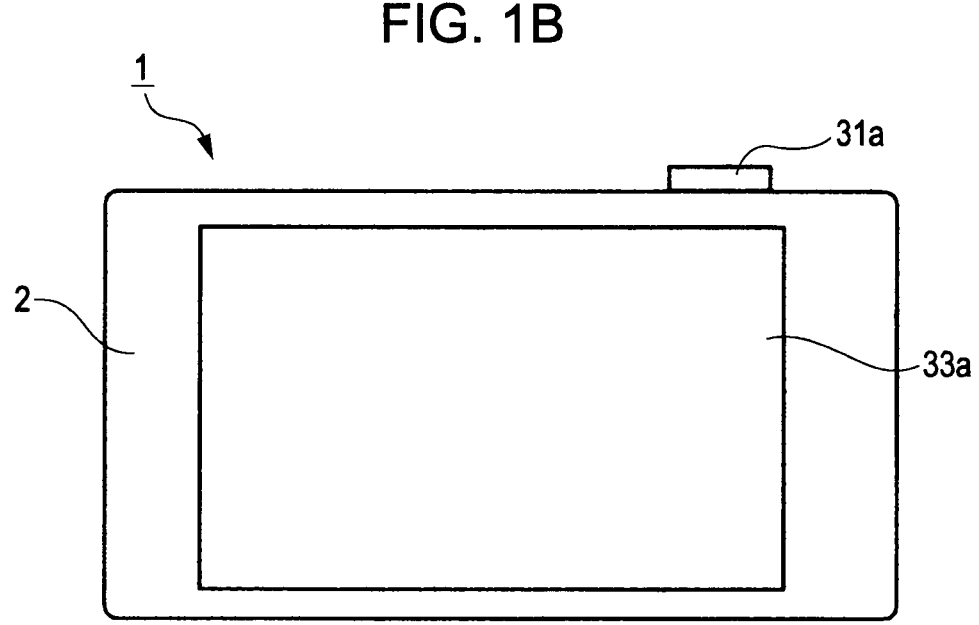

Firstly, FIG. 1 is a diagram illustrating an appearance of the digital still camera 1, in which FIGS. 1A and 1B illustrate a front view and a rear view of the digital still camera 1, respectively.

As shown in FIG. 1A, the digital still camera 1 includes a lens section 21a in a front surface side of a main body 2. The lens section 21a is a section which is provided outward the main body 2 as an optical system for imaging.

Further, a release button 31a is installed on an upper surface part of the main body 2. In an imaging mode, an image (captured image) which is captured by the lens section 21a is generated as an image signal. In addition, if operation with respect to the release button 31a is performed in the imaging mode, the captured image which is obtained at the time of the operation is recorded in a storage medium as still image data. That is, photography is performed.

As shown in FIG. 1B, the digital still camera 1 includes a display screen section 33a on a rear surface side thereof.

In the imaging mode, an image, which is called a moving image and is captured by the lens section 21a at that time, is displayed in the display screen section 33a. Further, in a reproduction mode, the image data which is recorded in a storage medium is reproduced and displayed. Moreover, according to operation with respect to the digital still camera 1 which is performed by a user, an operation image is displayed as a GUI (Graphical User Interface).

Further, the digital still camera 1 according to the present embodiment is configured so that a touch panel is combined with the display screen section 33a. Thus, a user can contact the display screen section 33a with his or her finger, to thereby perform the operation.

In addition, the imaging system (imaging device) according to the present embodiment includes an imaging device section which is the digital still camera 1, and a movable mechanism section (movable device section) which is the camera platform 10 to be described later, but a user can perform photography with only one digital still camera, in a similar way to a normal digital still camera.

Figure 2:
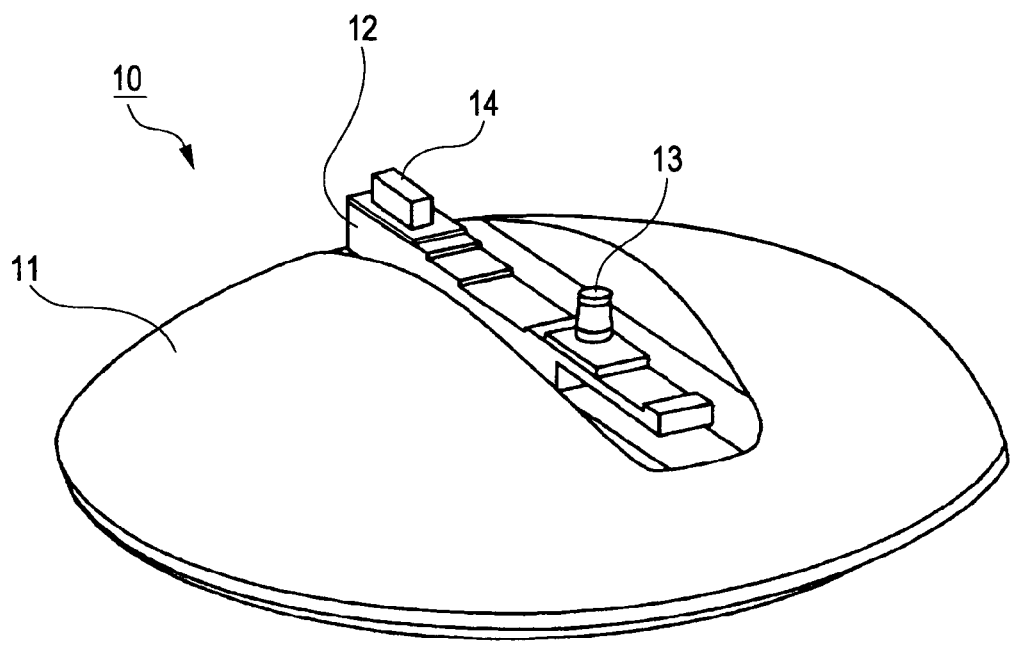
FIG. 2 is a perspective view illustrating an example of an appearance of a camera platform which forms an imaging system according to an embodiment of the invention.
Figure 3:
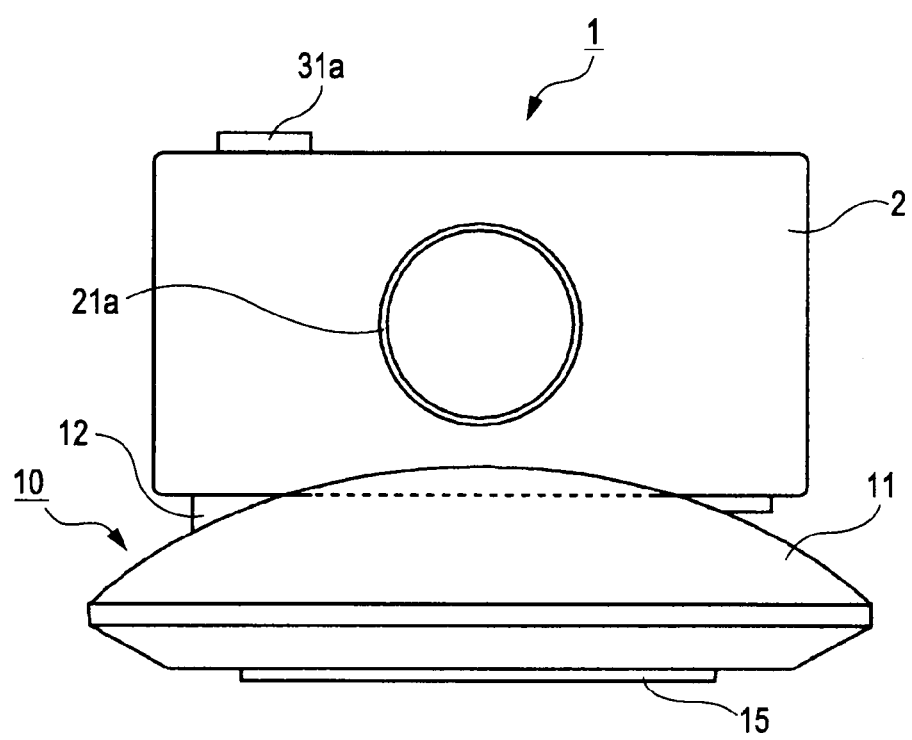
FIG. 3 is a front view illustrating an example of a state where a digital still camera is installed to a camera platform, as an imaging system according to an embodiment of the invention.
Figure 4:
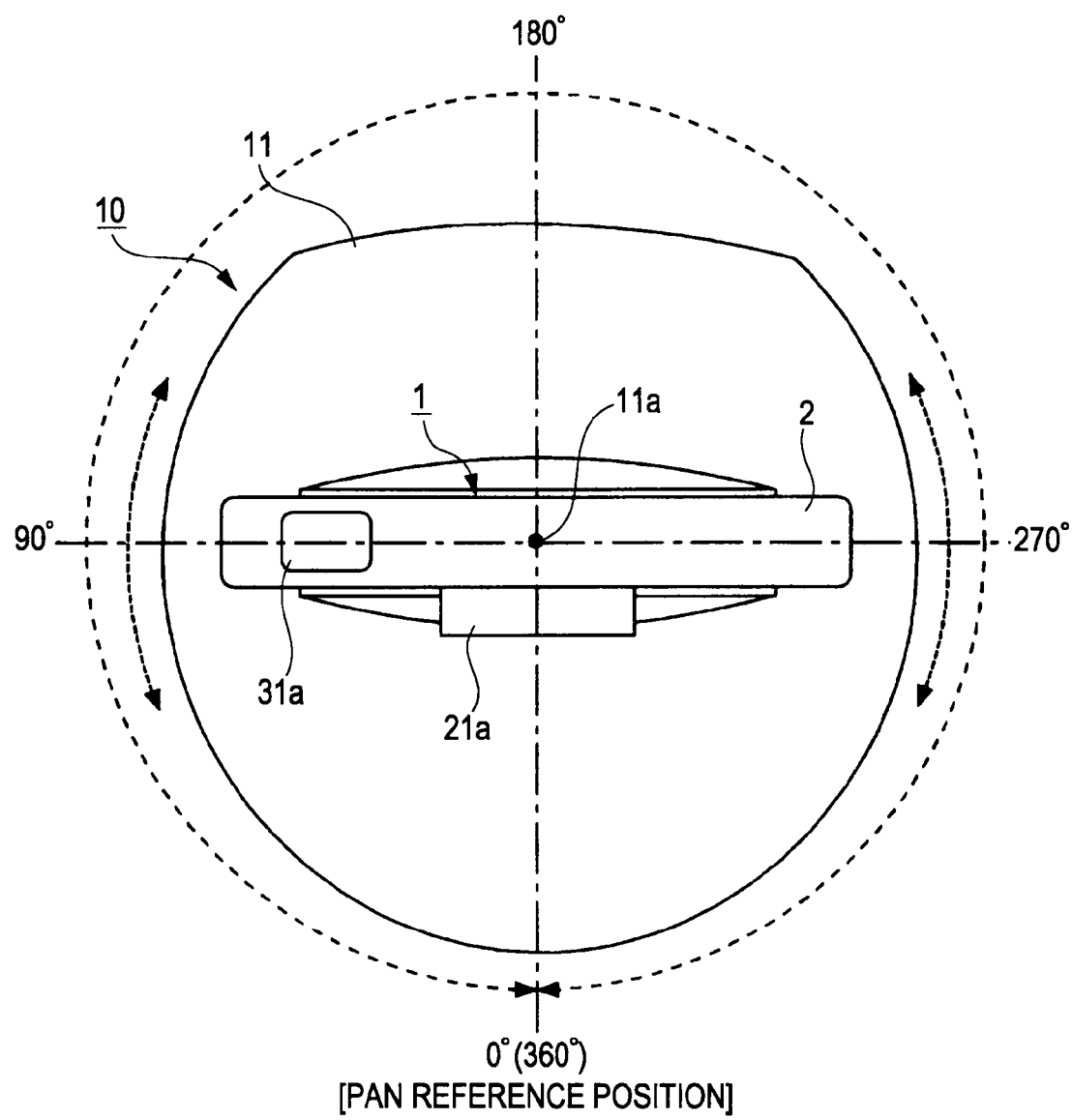
FIG. 4 is a plan view illustrating an example of a state where a digital still camera is installed to a camera platform, and an example of a movement in a pan direction, as an imaging system according to an embodiment of the invention.
Figure 5A:
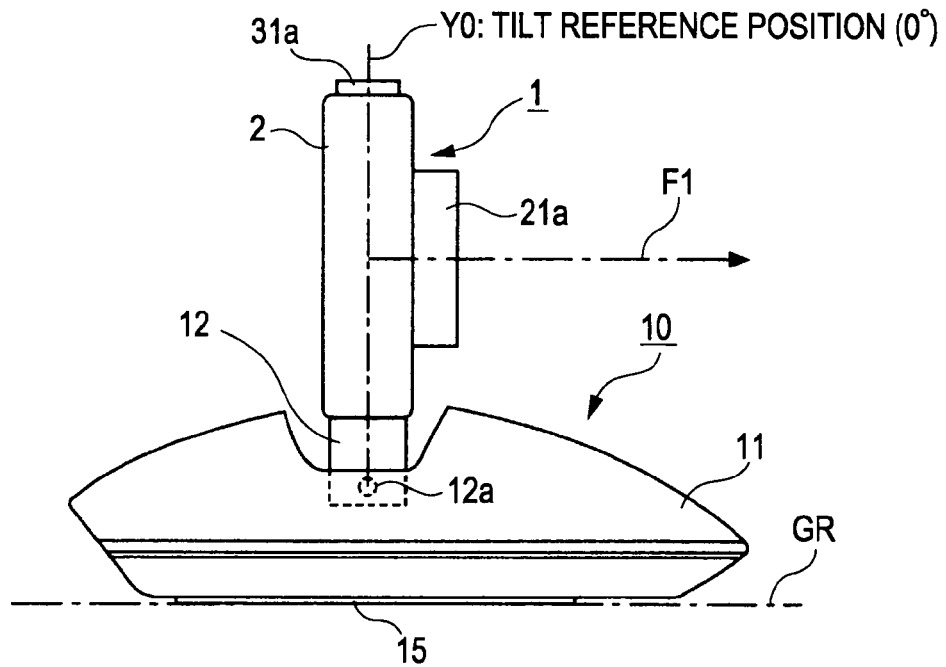
FIGS. 5A and 5B are side views illustrating an example of a state where a digital still camera is installed to a camera platform, as an imaging system according to an embodiment of the invention.
Figure 5B:
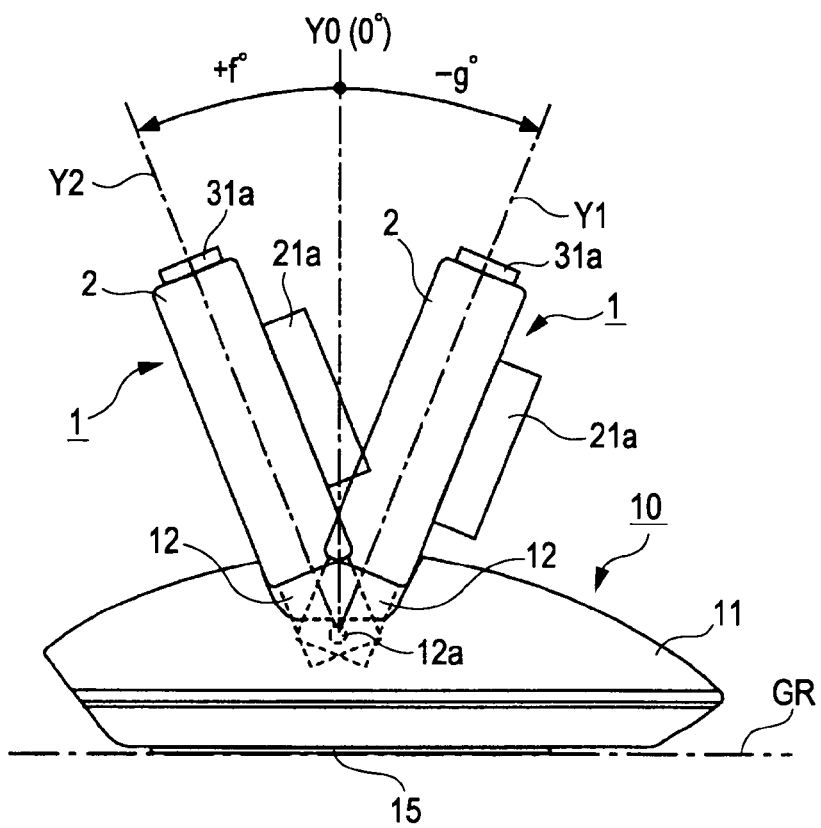

FIG. 2 is a perspective view illustrating an appearance of the camera platform 10. Further, FIGS. 3 to 5 illustrate, as an appearance of the imaging system according to the present embodiment, a state where the digital still camera 1 is properly mounted with respect to the camera platform 10. Here, FIG. 3 is a front view thereof; FIG. 4 is a plan view and FIG. 5A is a side view. FIG. 5B is a side view thereof illustrating a movable range of a tilt mechanism.

As shown in FIGS. 2, 3, 4 and 5A, the camera platform 10 is configured so that the main body 11 is combined on a ground base 13 and a camera mounting section 12 is installed to the main body 11.

When the digital still camera 1 is to be mounted on the camera platform 10, a bottom surface side of the digital still camera 1 is mounted with respect to an upper surface side of the camera mounting section 12.

In this respect, as shown in FIG. 2, a protrusion section 13 and a connector 14 are installed on the upper surface side of the camera mounting section 12.

Although not shown, a hole section, which is engaged with the protrusion section 13, is formed on the lower surface part of the main body 2 of the digital still camera 1. In a state where the digital still camera 1 is properly mounted with respect to the camera mounting section 12, the hole section is engaged with the protrusion section 13. In this state, in normal panning and tilting operations of the camera platform 10, the digital still camera 1 is not deviated or separated from the camera platform 10.

Further, in the digital still camera 1, a connector is installed in a predetermined position of the lower surface part thereof. In this way, in the state where the digital still camera 1 is properly mounted on the camera mounting section 12, the connector of the digital still camera 1 is connected to the connector 14 of the camera platform 10, to thereby enable communication therebetween.

For example, in the embodiment, the connector 14 and the protrusion section 13 are configured to be actually movable in the camera mounting section 12. In addition, for example, an adaptor which is suitable for the shape of the bottom surface part of the digital still camera 1 can be further used, and thus, a different type digital still camera can be mounted on the camera mounting section 12 in the state of capable of communicating with the camera platform 10.

Further, the communication between the digital still camera 1 and the camera mounting section 12 may be performed in a wireless manner.

In addition, in the state where the digital still camera 1 is mounted with respect to the camera platform 10, charging may be performed with respect to the digital still camera 1 from the camera platform 10. Further, an image signal of an image or the like which is reproduced in the digital still camera 1 may be transmitted to the camera platform 10, and the transmitted signal may be output to an external monitor device through a cable or a wireless communication or the like from the camera platform 10. That is, the camera platform 10 may be used for changing an imaging view range of the digital still camera 1, and further may have a so-called cradle function.

Next, a basic movement in pan and tilt directions of the digital still camera 1 due to the camera platform 10 will be described.

First, the basic movement of the pan direction is performed as follows.

In a state where the camera platform 10 is disposed on a floor surface or the like, a bottom surface of a ground base 15 is in contact with the floor surface or the like. In this state, as shown in FIG. 4, the main body 11 is configured to be able to rotate in a clockwise direction and in a counterclockwise direction centering around a rotation shaft 11a. Thus, an imaging view range of the digital still camera 1 which is mounted on the camera platform 10 is changed along a left and right direction (horizontal direction). That is, a panning movement is performed.

In addition, in this case, the pan mechanism of the camera platform 10 includes a structure which provides a free rotation of 360° or more without limitation, with respect to any direction of the clockwise direction and the counterclockwise direction.

Further, in the pan mechanism of the camera platform, a reference position is set in the pan direction.

In this respect, as shown in FIG. 4, the pan reference position is set to 0° (360°), and the rotation position of the main body 11 along the pan direction, that is, the pan position is indicated in the range of 0° to 360°.

Further, the basic movement of the camera platform 10 in the tilt direction is performed as follows.

As shown in FIGS. 5A and 5B, the movement of the tilt direction is performed as the camera mounting section 12 moves in opposite directions of an elevation angle and a depression angle centering around the rotation shaft 12a.

In this respect, FIG. 5A illustrates a state where the camera mounting section 12 is positioned in a tilt reference position Y0 (0°). In this state, an imaging direction F1 which coincides with an imaging optical axis of the lens section 21a (optical system) is parallel with a ground surface section GR with which the ground base 15 is in contact.

Furthermore, as shown in FIG. 5B, firstly, in an elevation direction, the camera mounting section 12 can move in the range of a predetermined maximum rotation angle +f° from the tilt reference position Y0 (0°), centering around the rotation shaft 12a. Further, in a depression direction, the camera mounting section 12 can move in the range of a predetermined maximum rotation angle −g° from the tilt reference position Y0 (0°), centering around the rotation shaft 12a. In this way, as the camera mounting section 12 moves in the range between the maximum rotation angle +f° and the maximum rotation angle −g° with reference to the tilt reference position Y0 (0°), the imaging view range of the digital still camera 1 which is mounted on the camera platform 10 (camera mounting section 12) is changed in an up and down direction (vertical direction). That is, a tilting movement is obtained.

An appearance configuration of the camera platform 10 as shown in FIGS. 2 to 5 is only an example, and thus, as long as the mounted digital still camera 1 can move in the pan direction and the tilt direction, different physical configurations or structures may be used.

1-2. Digital Still Camera

Figure 6:
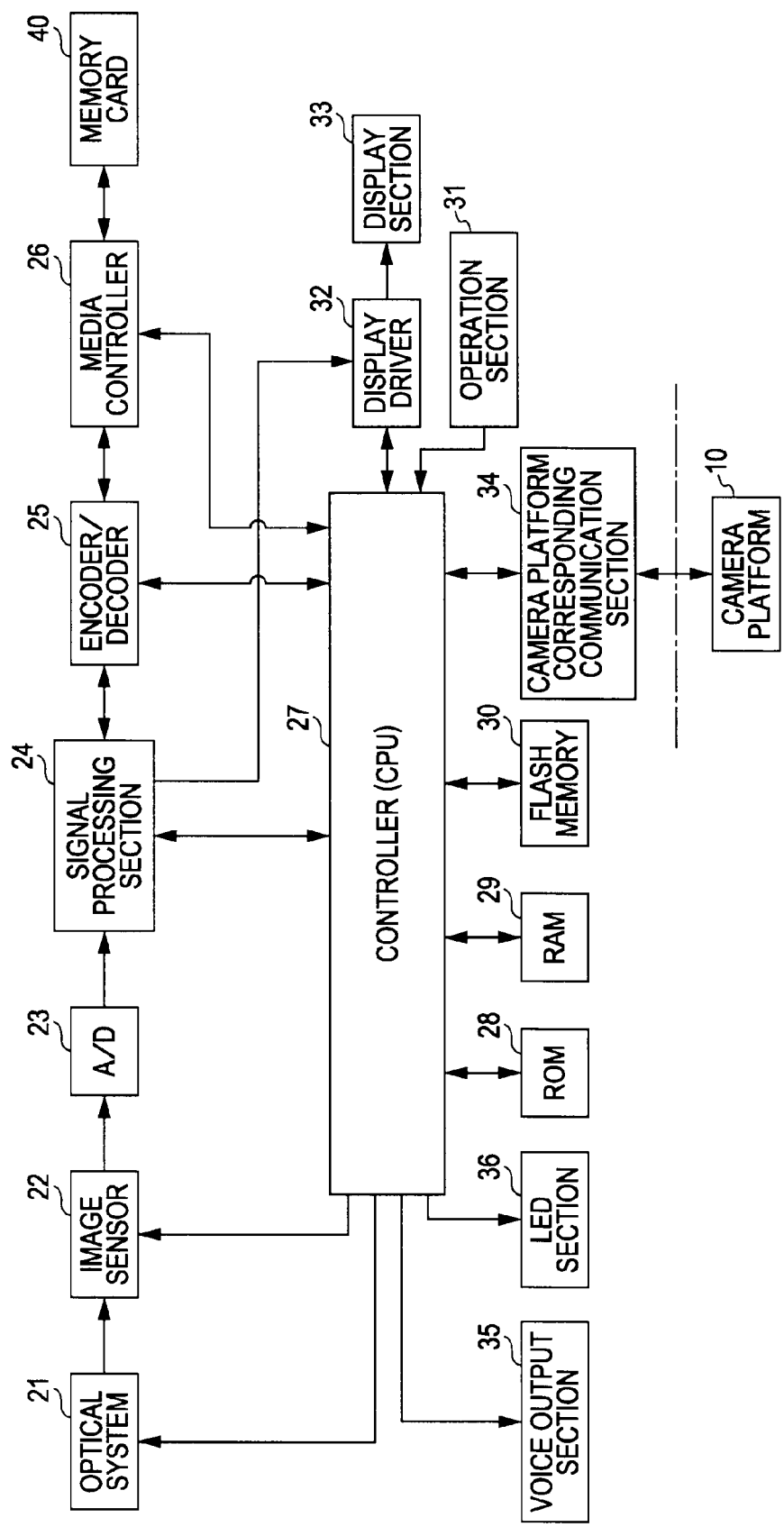
FIG. 6 is a block diagram illustrating an example of a configuration of a digital still camera.

First, FIG. 6 is a block diagram illustrating an example of an actual internal configuration of the digital still camera 1.

In FIG. 6, an optical system 21 includes an imaging lens group having a plurality of imaging lenses such as a zoom lens and focus lens, and a diaphragm and the like, and enables an image to be formed on a light sensing surface of an image sensor 22 using incident light as imaging light.

The optical system 21 also includes a driving mechanism for driving the zoom lens, the focus lens, the diaphragm, and so on. Operations of the driving mechanism are controlled by a so-called camera control which is performed by a controller 27, for example, zoom (field angle) control, automatic focus adjustment control, and automatic exposure control.

The image sensor 22 performs a so-called photoelectric conversion in which imaging light obtained in the optical system 21 is converted into electric signals. Accordingly, the image sensor 22 receives the imaging light from the optical system 21 at a light sensing surface of a photoelectric conversion element, and sequentially outputs signal charges which are accumulated in accordance with the intensity of the received light at a predetermined timing. Thus, electric signals (imaging signals) corresponding to the imaging light are output. The photoelectric conversion element (imaging device) which is employed as the image sensor 22 is not particularly limited, but a CMOS sensor or a CCD (Charge Coupled Device) or the like can be exemplified. Further, in the case of using the CMOS sensor, an A/D converter 23 corresponding to an A/D converter which will be described later may be included as a device (component) corresponding to the image sensor 22.

The imaging signal which is output from the image sensor 22 is input to the A/D converter 23, is converted into a digital signal, and then is input to a signal processing section 24.

In the signal processing section 24, the digital imaging signal which is output from the A/D converter 23 is imported in a unit corresponding to a single still image (frame image), and a predetermined signal processing is performed with respect to the imported imaging signal of the still image unit, to thereby generate captured image data (captured still image data) which is image signal data corresponding to the single still image.

In this way, in a case where the captured image data which is generated by the signal processing section 24 is recorded as image information in a memory card 40 which is a storage medium (storage medium device), for example, the captured image data corresponding to the single still image is output to an encoder/decoder 25 from the signal processing section 24.

The encoder/decoder 25 performs compression coding by a predetermined still image compression coding method, performs, for example, addition of a header or the like under the control of the controller 27, and then performs conversion into an image data format which is compressed in a predetermined format, with respect to the captured image data of the still image unit which is output from the signal processing section 24. Further, the generated image data is transmitted to a media controller 26. The media controller 26 performs control so that the transmitted image data is written and recorded in the memory card 40 under the control of the controller 27. In this case, the memory card 40 is a storage medium which employs a configuration that includes, an external shape of a card format according to a predetermined standard and an internal non-volatile semiconductor storage element such as a flash memory. In addition, the storage medium for storing the image data may have a type, a format or the like which is different from the above described memory card.

Further, the signal processing section 24 according to the present embodiment performs an image processing which is subject detection using the captured image data which is obtained as described above, which will be described later.

In addition, the digital still camera 1 performs image display by a display section 33 using the captured image data which is obtained by the signal processing section 24, to thereby display a so-called moving image which is an image during being captured currently. For example, in the signal processing section 24, as described above, the imaging signal which is output from the A/D converter 23 is imported to generate the captured image data corresponding to the single still image, but the operation may be continuously performed to sequentially generate the captured image data corresponding to a frame image in a moving image. Further, the sequentially generated captured image data is transmitted to a display driver 32 under the control of the controller 27. Thus, the display of the moving image is performed.

In the display driver 32, a driving signal for driving the display section 33 is generated on the basis of the captured image data which is input from the signal processing section 24 as described above, and is output to the display section 33. Thus, in the display section 33, images based on the captured image data of the still image unit are sequentially displayed. If a user views this state, the images which have been captured at that time are displayed in the display section 33 as the moving image. That is, the moving image is displayed.

Further, the digital still camera 1 reproduces the image data which is recorded in the memory card 40 and enables the image to be displayed on the display section 33.

To this end, the controller 27 designates image data and commands data reading from the memory card 40 with respect to the media controller 26. In response to this command, the media controller 26 accesses an address on the memory card 40 in which the designated image data is recorded to perform the data reading, and transmits the read data to the encoder/decoder 25.

The encoder/decoder 25 extracts, for example, actual data as compression still image data from the captured image data which is transmitted from the media controller 26 under the control of the controller 27, and performs a decoding process with respect to the compression coding, with respect to the compression still image data, to thereby obtain the captured image data corresponding to the single still image. Then, the captured image data is transmitted to the display driver 32. Thus, in the display section 33, images of the captured image data which is recorded in the memory card 40 are reproduced and displayed.

With respect to the display section 33, a user interface image (operation image) may be displayed, in addition to the moving image, the reproduction image of the image data and the like. In this case, for example, the controller 27 generates display image data which is a predetermined user interface image according to the operation state, and outputs the generated display image data to the display driver 32. Accordingly, the user interface image can be displayed through the display section 33. Further, the user interface image can be displayed on a display screen of the display section 33, independently of a monitor image such as a specific menu screen or the reproduction image of the captured image data, and can be displayed to be overlapped and combined with a part of the monitor image or the reproduction image of the captured image data.

For example, the controller 27 is actually provided with a CPU (Central Processing Unit), and forms a microcomputer in cooperation with a ROM 28, a RAM 29 and so on. For example, a program that is to be executed by the CPU which is the controller 27, and various setting information or the like relating to the operation of the digital still camera 1 are stored in the ROM 28. The RAM 29 serves as a main storage device for the CPU.

Further, the flash memory 30 in this case is installed as a non-volatile storage space for use in recording the various setting information or the like which is used for change (rewrite) according to user operation, operation history or the like. Further, with respect to the ROM 28, for example, in a case where a non-volatile memory including the flash memory is employed, a part of a storage space in the ROM 28 other than the flash memory 30 may be used.

The operation section 31 represents in a batch a variety of manipulators which is provided in the digital still camera 1, and an operation information signal output portion which generates an operation information signal according to operation which is performed with respect to the manipulators and outputs the generated operation information signal to the CPU. The controller 27 performs a predetermined process according to the operation information signal which is input from the operation section 31. Thus, an operation of the digital still camera 1 according to the user operation is performed.

The voice output section 35 is a section which outputs an electric sound with a predetermined tone and pronunciation pattern for notifying, for example, a predetermined content under the control of the controller 27.

An LED section 36 is provided with an LED (Light Emitting Diode) which is externally installed in a front surface part of a casing of the digital still camera 1, and a circuit or the like for driving the LED for lighting, and turns on and off the LED under the control of the controller 27. A predetermined content notification is performed according to the pattern of turning on and off the LED.

A camera platform corresponding communication section 34 performs communication according to a predetermined communication method between the camera platform 10 and the digital still camera 1. The camera platform corresponding communication section 34 includes a configuration of a physical layer for enabling transmission and reception of a communication signal in a wired or wireless manner with respect to a communication section of the camera platform 10, for example, in a state where the digital still camera 1 is mounted to the camera platform 10, and a configuration for realizing a communication process corresponding to a predetermined layer which is positioned above the physical layer. As the above described physical layer configuration, there is provided a portion of a connector which is connected with the connector 14 as shown in FIG. 2.

1-3. Camera Platform

Figure 7:
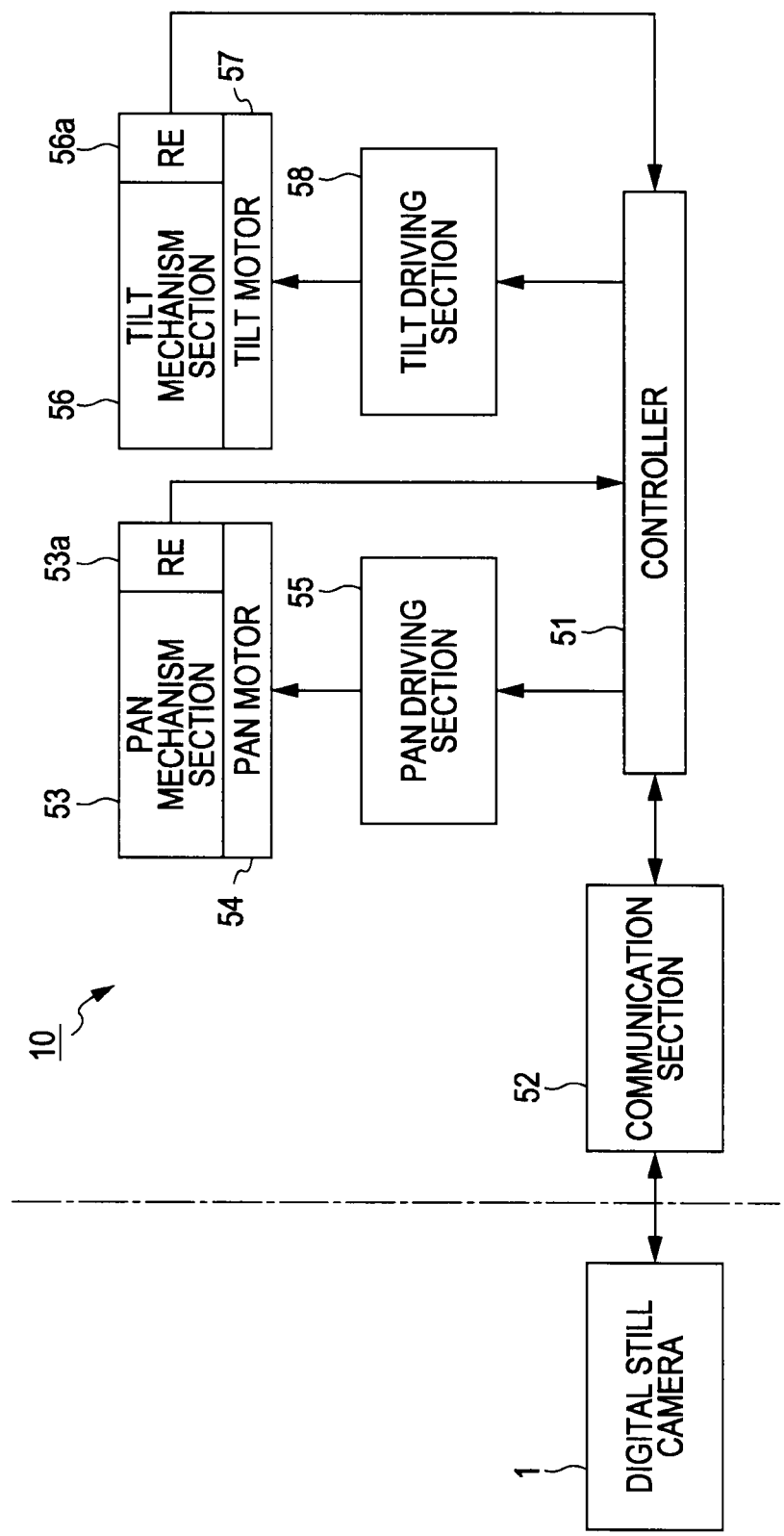
FIG. 7 is a block diagram illustrating an example of a configuration of a camera platform.

FIG. 7 is a block diagram illustrating an internal configuration example of the camera platform 10.

As described above, the camera platform 10 includes a pan-tilt mechanism, and includes a pan mechanism section 53, a pan motor 54, a tilt mechanism section 56 and a tilt motor 57.

The pan mechanism section 53 includes a mechanism for providing a movement in the pan (horizontal, left and right) direction as shown in FIG. 4, with respect to the digital still camera 1 which is mounted on the camera platform 10, and the movement of the mechanism is obtained as the pan motor 54 rotates in a forward or reverse direction. Similarly, the tilt mechanism section 56 includes a mechanism for providing a movement in the tilt (vertical, up and down) direction as shown in FIG. 5B, with respect to the digital still camera 1 which is mounted on the camera platform 1, and the movement of the mechanism is obtained as the tilt motor 57 rotates in a forward or reverse direction.

A controller 51 is provided with a microcomputer which is formed by combination of a CPU, a ROM, a RAM or the like, and controls the movements of the pan mechanism section 53 and the tilt mechanism section 56. For example, when controlling the movement of the pan mechanism section 53, the controller 51 outputs a signal indicating a movement target direction and speed to a pan driving section 55. The pan driving section 55 generates a motor driving signal corresponding to the input signal and outputs the generated signal to the pan motor 54. The motor driving signal becomes a pulse signal corresponding to a PWM control, for example, if the motor is a stepping motor.

The pan motor 54 rotates, for example, in a predetermined rotation direction and speed in response to the motor driving signal, and as a result, the pan mechanism section 53 is driven to move in a corresponding movement direction and speed.

Similarly, when controlling the movement of the tilt mechanism section 56, the controller 51 outputs a signal indicating a movement target direction demanded for the tile mechanism section 56 and speed to a tilt driving section 58. The tilt driving section 58 generates a motor driving signal corresponding to the input signal and outputs the generated signal to the tilt motor 57. The tilt motor 57 rotates in a predetermined rotation direction and speed in response to the motor driving signal, and as a result, the tilt mechanism section 56 is driven to move in a corresponding movement direction and speed.

Further, the pan mechanism section 53 includes a rotary encoder (rotation detector) 53a. The rotary encoder 53a outputs, according to the rotation movement of the pan mechanism section 53, a detection signal indicating the amount of the rotation angle to the controller 51. Similarly, the tilt mechanism section 56 includes a rotary encoder 56a. The rotary encoder 56a outputs, according to the rotation movement of the tilt mechanism section 56, a signal indicating the amount of the rotation angle to the controller 51.

A communication section 52 is a section which performs communication according to a predetermined communication method with respect to the camera platform corresponding communication section 34 in the digital still camera 1 which is mounted on the camera platform 10, and in a similar way to the camera platform corresponding communication section 34, a configuration of a physical layer for enabling transmission and reception of a communication signal in a wired or wireless manner with respect to a communication section of the other party, and a configuration for realizing a communication process corresponding to a predetermined layer which is positioned above the physical layer. As the above described physical layer configuration, there is provided the connector 14 of the camera mounting section 12 as shown in FIG. 2.

2. Example of Functional Configuration Corresponding to Composition Control According to an Embodiment FIG. 8 is a block diagram illustrating an example of a functional configuration which is realized by hardware and software (programs), with respect to the digital still camera 1 and the camera platform 10 which form the imaging system corresponding to the present embodiment.

Figure 8:
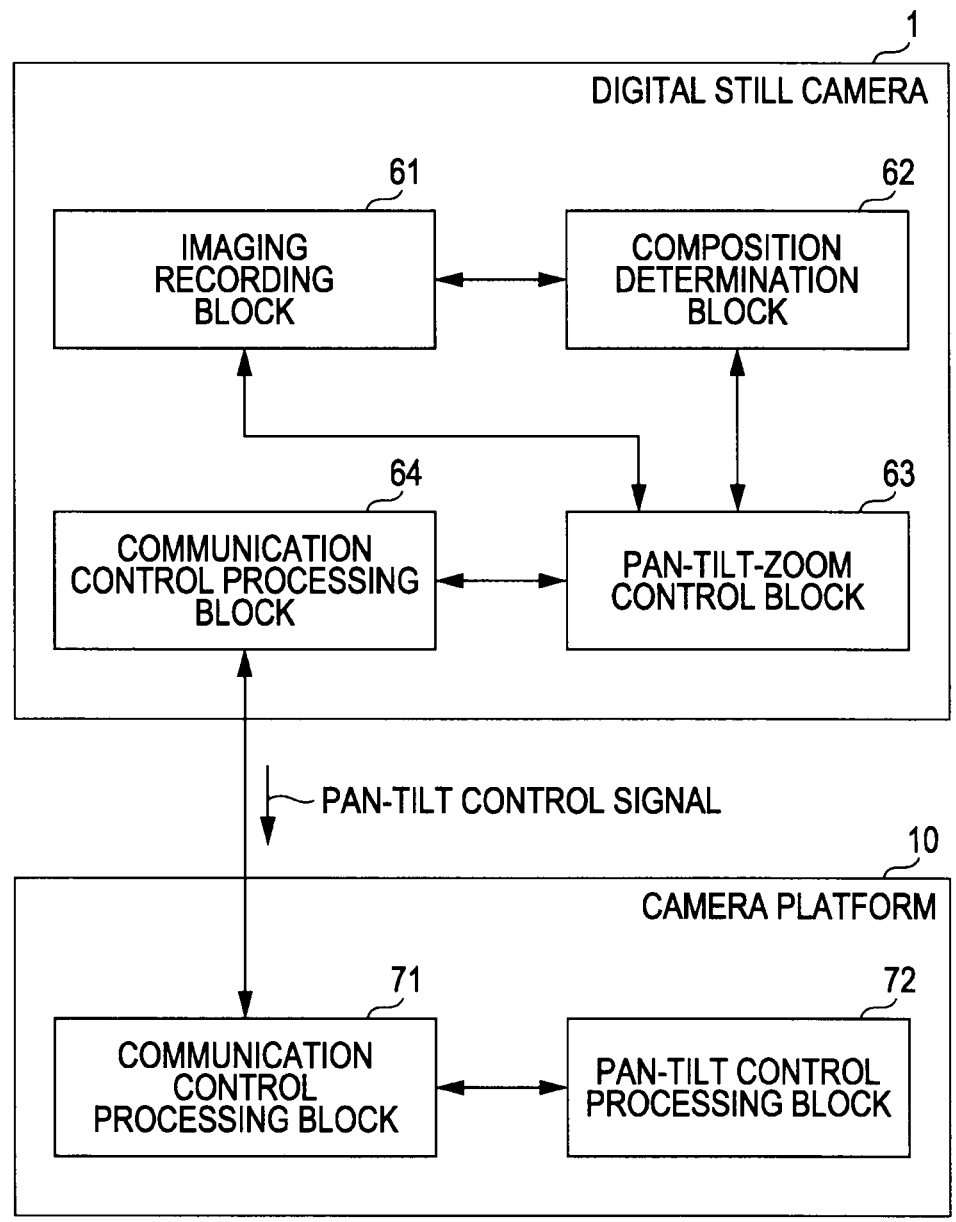
FIG. 8 is a diagram illustrating functional blocks corresponding to a composition control of a digital still camera according to an embodiment of the invention.

In FIG. 8, the digital still camera 1 includes an imaging recording block 61, a composition determination block 62, a pan-tilt-zoom control block 63 and a communication control processing block 64.

The image recording block 61 is a section which performs a control process for obtaining an image obtained by imaging as image signal data (captured image data) and for storing the captured image data in a storage medium. For example, the section is provided with a section including an optical system for imaging, an imaging element (image sensor), a signal processing circuit which is configured to generate the captured image data from a signal output from the imaging element, a recording control and processing system for writing the captured image data in the storage medium for recording (storage), and the like.

In this case, the recording (imaging recording) of the captured image data in the imaging recording block 61 is performed under the instruction and control of the composition determination block.

The composition determination block 62 imports and receives the captured image data output from the imaging recording block 61, firstly performs subject detection on the basis of the captured image data, and then, performs a composition determination process.

In this embodiment, in the composition determination, an attribute detection which will be described later is performed with respect to every subject detected by means of the subject detection. Further, in the composition determination process, an optimal composition is determined using the detected attribute. Further, a composition framing control for obtaining captured image data of image content according to the determined composition is also performed.

In this respect, the subject detection process (including setting of initial face frames) which is performed by the composition determination block 62 may be performed by the signal processing section 24 as shown in FIG. 6. Further, the subject detection process in the signal processing section 24 may be realized as an image signal process due to a DSP (Digital Signal Processor). That is, the subject detection process may be realized by a program or an instruction which is provided to the DSP.

Further, modification of a face frame, the composition determination and the composition framing control performed by the composition determination block 62 can be realized as a process which is performed according to the program by the CPU which is the controller 27.

The pan-tilt-zoom control block 63 performs a pan-tilt-zoom control so that a composition and an imaging view range are obtained according to the determined optimal composition, under the instruction of the composition determination block 62. That is, the composition determination block 62 instructs the pan-tilt-zoom control block 63 to obtain the composition and the imaging view range according to the determined optimal composition, as the composition framing control. The pan-tilt-zoom control block 63 calculates a movement amount with respect to the pan-tilt mechanism of the camera platform 10 for enabling the digital still camera 1 to face an imaging direction in which the instructed composition and imaging view range are obtained, and generates a pan-tilt control signal for instructing a movement according to the calculated movement amount.

Further, for example, the pan-tilt-zoom control block 63 controls a zoom mechanism which is provided in the imaging recording block 61 so that the position of the zoom lens for obtaining a determined appropriate field angle (zoom magnification) is calculated to obtain the zoom position.

The communication control processing block 64 is a section for performing communication according to a predetermined communication protocol with respect to a communication control processing block 71 which is provided in the camera platform 10. The pan-tilt control signal which is generated by the pan-tilt-zoom control block 63 is transmitted to the communication control processing block 71 of the camera platform 10 through the communication of the communication control processing block 64.

For example, as shown in the figure, the camera platform 10 includes the communication control processing block 71 and a pan-tilt control processing block 72.

The communication control processing block 71 is a section for performing the communication with respect to the communication control processing block 64 of the digital still camera 1, and outputs, when receiving the pan-tilt control signal, the received pan-tilt control signal to the pan-tilt control processing block 72.

The pan-tilt control processing block 72 corresponds to the function of performing a process with respect to the pan-tilt control among control processes which are performed by a controller 51 (microcomputer) of the camera platform 10 as shown in FIG. 7, for example.

The pan-tilt control processing block 72 controls a pan driving mechanism section and a tilt driving mechanism section (which are not shown here), according to the input pan-tilt control signal. Thus, the panning and tilting operations are performed for obtaining a horizontal view angle and a vertical view angle according to the optimal composition.

Further, for example, the pan-tilt-zoom control block 63 can perform the pan-tilt-zoom control for searching the subject under the instruction of the composition determination block 62.

3. Composition Control (First Example)

A first example of a composition control capable of being realized by the above described configuration of the digital still camera 1 and the camera platform 10 will be described below.

Figure 9:
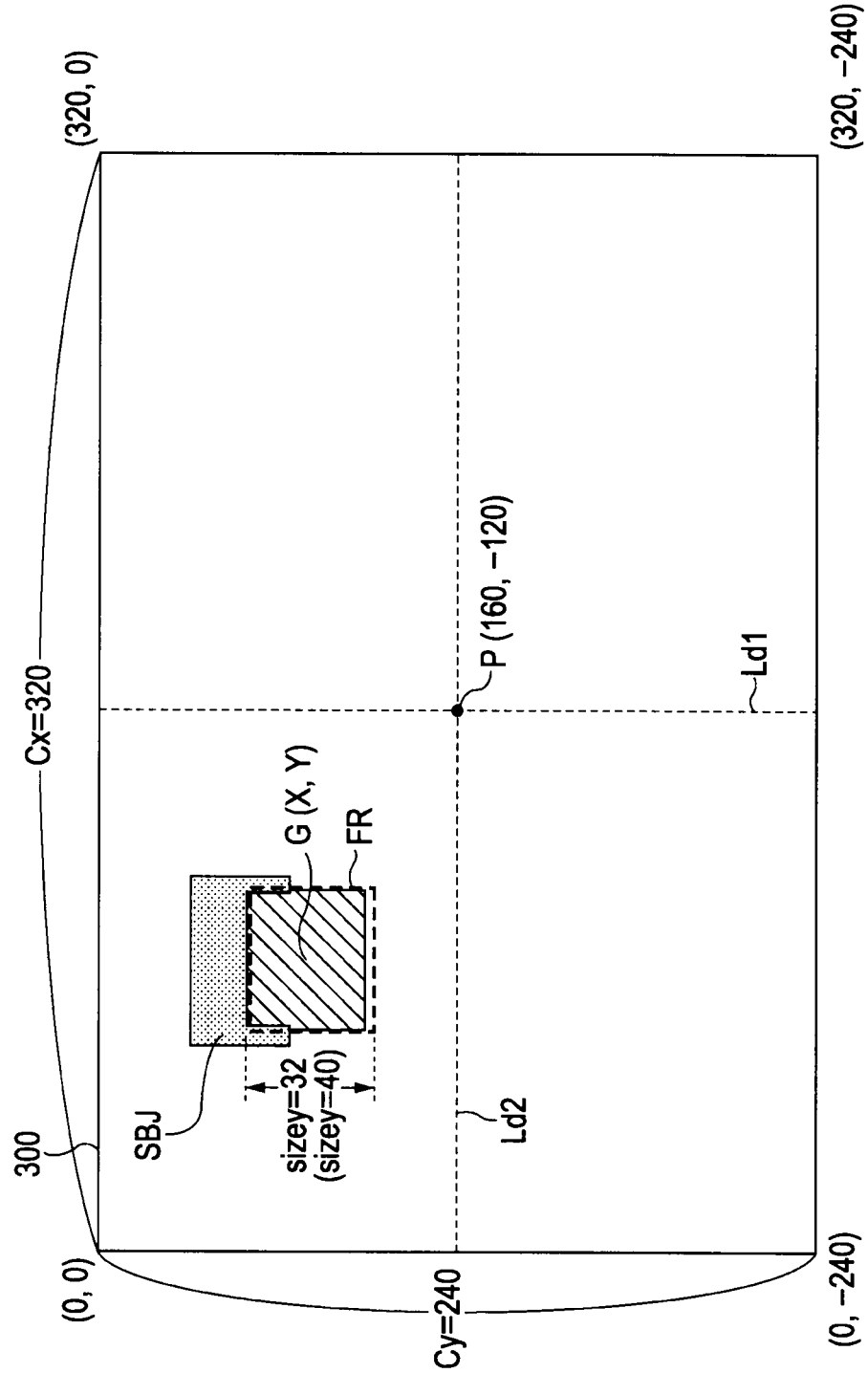
FIG. 9 is a diagram illustrating an example of image content when a subject is detected in an image frame of image data.

In this respect, the composition determination block 62 is configured to import capture image data of image content in an image frame 300 as shown in FIG. 9, for the subject detection process. The image content of the captured image data is obtained by capturing an image in which a single subject who is a person exists.

In this case, the image frame 300 corresponds to an image area of one frame of the captured image data. In this respect, when the number of horizontal pixels (horizontal image size) is represented as Cx, and the number of vertical pixels (vertical image size) is represented as Cy, a frame image which is the image frame 300 is formed by setting Cx=320 and Cy=240.

In this case, the position in the image frame 300 is expressed by coordinates (X,Y), and here, a left upper edge of the image frame 300 is defined as coordinates (0,0).

Further, with respect to the image frame 300, a vertical reference line Ld1 and a horizontal reference line Ld2 are virtually set. The virtual reference line Ld1 is a straight line passing a midpoint of the image frame 300 in the horizontal direction, and the horizontal reference line Ld2 is a straight line passing a midpoint of the image frame 300 in the vertical direction. The vertical reference line Ld1 and the horizontal reference line Ld2 each become reference lines for moving the position of the subject in the image frame 300 in the horizontal and vertical directions, in the composition control. Further, coordinates (160,−120) of an intersection of the vertical reference line Ld1 and the horizontal reference line Ld2 are recognized as a reference point P in the composition control.

The subject detection (face detection) is performed using the captured image data of the image content as shown in FIG. 9 as a target, and thus, a face of a single subject SBJ as shown in the figure, which is the subject, is detected. That is, as one face is detected by the face detection process, one subject is detected. Further, as a result of such a subject detection, as described above, information about the number, direction, position and size of the subjects is obtained.

Further, for example, the number of the subjects may be calculated by the number of faces detected by the face detection. In the case of FIG. 9, since one face is detected, the number of the subjects becomes one.

Further, in a case where the composition determination block 62 performs the subject detection using the face detection technique, the composition determination block 62 sets a frame with respect to a face section of the detected subject as the detection result. In this respect, the frame is referred to as a face frame. In FIG. 9, the face frame FR is arranged corresponding to the face section of the image of the subject SBJ. In this case, the face frame FR is arranged in a rectangular shape corresponding to the image region of the face in the detected subject. The face frame FR is a square shape. Further, the face frame FR is set with respect to the image region as the face in the image frame 300. Accordingly, according to the position, size or the like of the face of the subject in the image frame 300 which is detected by the face detection process at that time, the position and size of the face frame FR in the image frame 300 are also changed and set.

Further, with respect to position information for every subject, at least a subject gravity center G(X,Y) which is the center of the subject SBJ in the image as the captured image data is calculated.

In addition, a setting method of the subject gravity center G can employ any subject gravity center detection method which is known so far. For example, an intersection of diagonal lines in a quadrangle which is the face frame FR detected corresponding to the subject SBJ may be set as the subject gravity center.

Further, the size of the subject is expressed by the size (number of pixels) of one side of the face frame FR in the vertical or horizontal direction. For example, FIG. 9 illustrates a state where the vertical size of the face frame FR is detected as sizey=32.

Further, the face direction for every subject is detected as any one of three stages, for example, of the left side, the front side, and the right side. With respect to the subject SBJ in FIG. 9, the face direction is detected as the front side.

Figure 10:
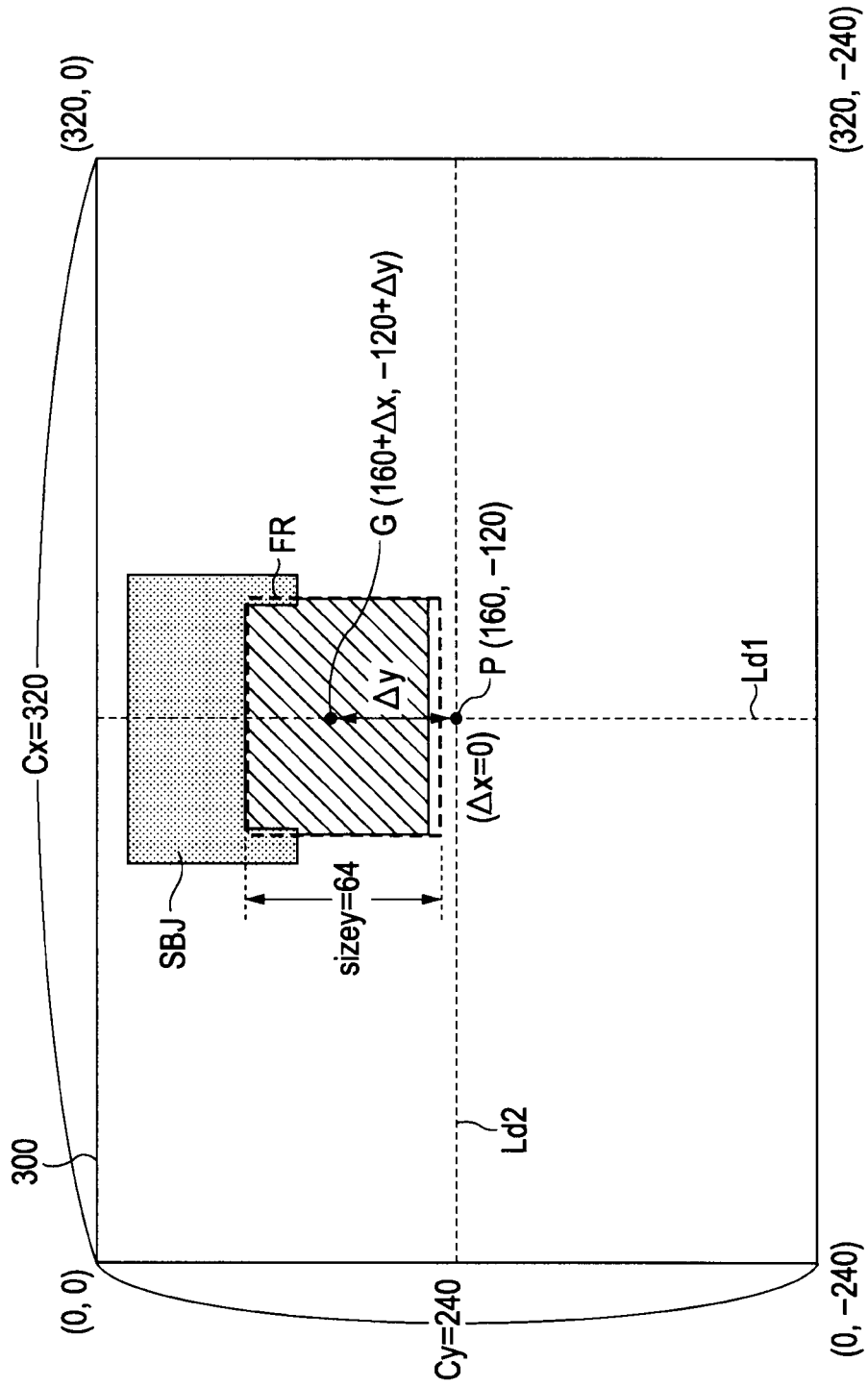
FIG. 10 is a diagram illustrating an example of image content in an image frame according to a composition which is determined to be obtained corresponding to the subject detected in FIG. 9.

On the basis of the subject detection information with respect to the detected subject SBJ as shown in FIG. 9, the composition control processing block 62 obtains a determination result as a composition as shown in FIG. 10, according to the composition determination process.

That is, firstly, the composition has a subject size which is set as sizey=64, and a subject gravity center G which is positioned in G(160,−120+Δy).

For example, the subject size becomes different according to the detected number, but the size of the subject in the image frame 300 is appropriately set not to be too small or too large, in order to obtain a good composition. The subject size sizey=64 as shown in FIG. 10 is determined as a value of an optimal size of the subject SBJ in the image frame 300.

In addition, the subject gravity center G is calculated, for example, on the following basis.

In the case where the subject SBJ is one, the simplest and most basic position of subject SBJ is located in the center of the image frame 300. That is, the subject gravity center G is positioned on the reference point P.

However, the composition in which the subject is positioned in the center of the screen is a typical example of an undesirable composition. Thus, the position of the subject may be shifted from the center of the screen according to a specific rule such as a three-part division or a golden rule division, to thereby obtain a desirable composition.

In this case, for example, the position (subject gravity center G) of the subject SBJ in the vertical direction in the image frame 300 is moved with respect to the horizontal reference line Ld2 by a predetermined amount. The movement amount of the subject gravity center G in the vertical direction with reference to the horizontal reference line Ld2, which is set with respect to the subject gravity center G in this way, is defined as a vertical offset amount Δy. The vertical offset amount Δy and a horizontal offset amount Δx which will be described later can be expressed, for example, by the number of the pixels. Thus, the Y coordinate of the subject gravity center G in FIG. 10 is expressed as (−120+Δy). Here, a positive value is given as the vertical offset amount Δy, and thus, as shown in the figure, the subject gravity center G is positioned in an upper area from the horizontal reference line Ld2 in the image frame 300.

Further, in the present embodiment, the position of the subject in the horizontal direction is based on the face direction detected with respect to the subject.

As described with reference to FIG. 9, in this case, the face direction of the subject SBJ is detected as the front side among the three stages of the right side, the front side and the left side.

Here, in a case where it is detected that the face direction of the one subject SBJ is the front side, the position of the subject SBJ is located in the center in the horizontal direction. That is, the X coordinate of the subject gravity center G is the X coordinate (160) which is the same as the midpoint in the horizontal direction, that is, the vertical reference line Ld1 (reference point P). In this case, the horizontal offset amount Δx which is defined as the movement amount of the subject gravity center G in the horizontal direction with reference to the vertical reference line Ld1 is set as 0.

In the case of FIG. 10, the subject gravity center G(160,−120+Δy) is set according to the above described composition determination rule and algorithm.

Further, although not shown, it is assumed that the face direction of the detected individual subject is the left side. Here, when a user actually views the image content of the image frame 300, the face direction of the left side represents a state where the face of the individual subject SBJ in the image frame 300 appears to be directed to the left side with respect to the user. That is, in a state where a direction opposite to the imaging device which performs the imaging is the front side, an actual person who is the individual subject SBJ is directed to the right side in reality.

In this case, the position of the subject gravity center G in the horizontal direction is located in the image area of the right side which is opposite to the left side indicated by the face direction, among the image areas (division areas) of the left and right sides which are divided into two parts by the vertical reference line Ld1. Accordingly, in the image frame 300, a space is obtained in the left side which is a direction where the face of the individual subject SBJ is directed in the image frame 300. With such a composition, more preferable composition can be obtained, for example, compared with a case that the gravity center G of the individual subject SBJ where the face direction is the left side is located in the subject position corresponding to (coinciding with) the center of the screen in the left and right direction, or a case that the gravity center G is located in the image area of the left side with reference to the vertical reference line Ld1.

Further, in a case where the face direction of the detected individual subject is the right side, in a way opposite to the case where the face direction of the detected individual subject is the left side, the subject gravity center G is positioned in the image area of the left side, among the image areas (division areas) of the left and right sides which are divided into two parts by the vertical reference line Ld1.

As can be understood from the above description, the composition determined in the present embodiment is determined by the size of the subject and the position of the subject gravity center G. Further, in the composition framing, the control is performed to actually obtain the determined subject size and the position of the subject gravity center G.

As described later, the change in the subject size may be performed by any one of the control (zoom control) for moving the zoom lens in the optical system 21 of the digital still camera 1, and an image signal process such as an image cutout with respect to the captured image data, but in this case, is assumed to be performed by the zoom control.

Further, in spite of the change in the position of the subject gravity center G, the change is performed by the pan control with respect to the pan mechanism of the camera platform 10 in the horizontal direction, and further, is performed by the tilt control with respect to the tilt mechanism of the camera platform 10 in the vertical direction.

That is, in the present embodiment, the composition framing control for obtaining the determination composition is performed by a combination of enlargement and reduction in the image by means of the zoom control and the movement of the image in the horizontal and vertical direction by means of the pan-tilt control.

Figure 16:
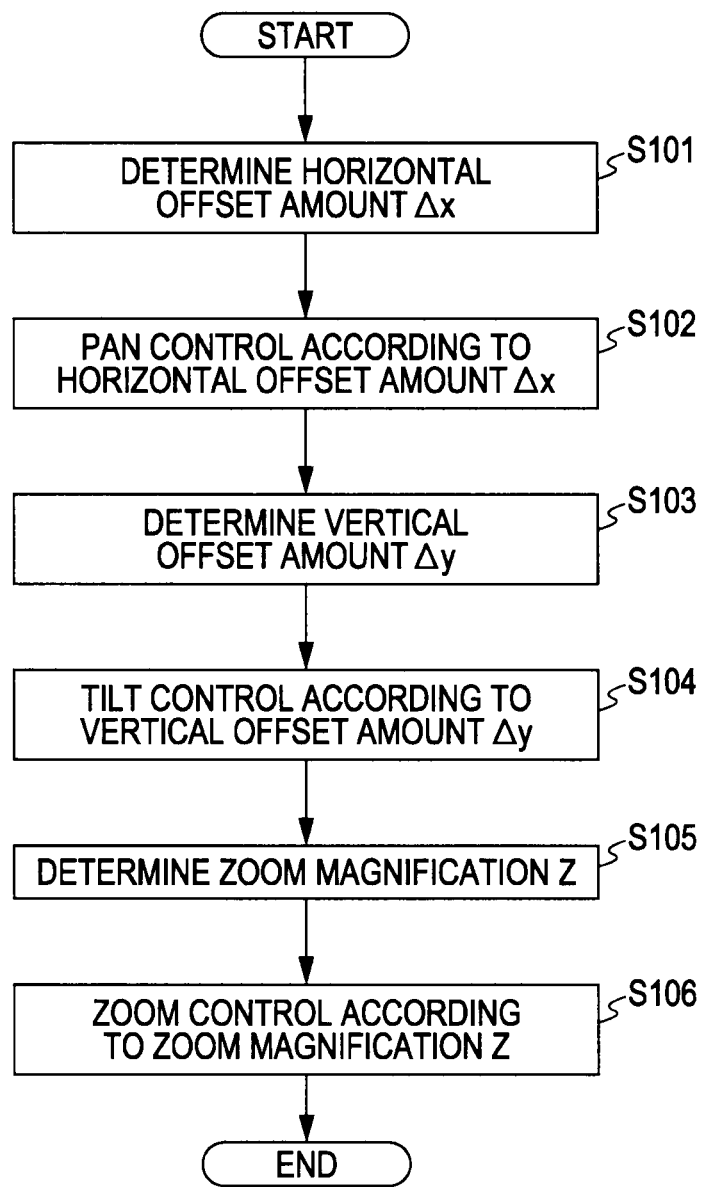
FIG. 16 is a flowchart illustrating an example of a process procedure for a composition control according to a first example.

FIG. 16 is a flowchart illustrating a first suitable example of a procedure of performing the zoom control and the pan/tilt control in the composition control. The process as shown in FIG. 16 is performed according to the detection of the subject in the image frame 300 as shown in FIG. 9. Further, the process in the figure may be appropriately performed by the composition determination block 62, the pan-tilt-zoom control block 63 as shown in FIG. 8, which are provided in the digital still camera 1.

With respect to the process in FIG. 16, firstly, the composition determination block 62 determines the horizontal offset amount Δx with respect to the optimal composition (target composition) according to a predetermined rule in step S101. Then, in step S102, the pan-tilt-zoom control block 63 performs the pan control so that the subject gravity center G is positioned in the X coordinate according to the horizontal offset amount Δx which is determined in step S101.

With respect to the composition control exemplified in FIGS. 9 and 10, the horizontal offset amount Δx is determined as 0, and accordingly, the subject gravity center G is moved in the horizontal direction to be positioned in the X coordinate (=160).

Subsequently, the composition determination block 62 determines the vertical offset amount Δy in step S103. The pan-tilt-zoom control block 63 performs the tilt control so that the subject gravity center G is positioned in the Y coordinate according to the vertical offset amount Δy determined in step S103.

With respect to the composition control exemplified in FIGS. 9 and 10, as shown in FIG. 10, the vertical offset amount Δy is set which moves upward with reference to the horizontal reference line Ld2 by a predetermined absolute value, and the subject gravity center G is moved in the vertical direction to be positioned in the Y coordinate (=−120+Δy).

Next, the composition determination block 62 determines the zoom magnification Z in step S103.

As described above, the size change of the subject SBJ in the image frame 300 is performed by changing an image field by means of the zoom control. In this respect, the zoom magnification is the magnification of an angle used for obtaining the size of the subject determined corresponding to the optimal composition, from the subject size at the time when the subject is detected by the subject detection process.

To this end, firstly, the composition determination block 62 determines a target subject size (zoom control target value) used for the optimal composition according to the predetermined rule, under the condition of the detected subject. For example, in the case where the detected subject is one, the subject size may be obtained by calculating, for example, the size (number of pixels) of one side of the face frame FR of the square shape in the vertical direction (or in the horizontal direction), as described with reference to FIGS. 9 and 10.

Further, the ratio between the target subject size size-trg calculated in this way and the subject size size-org obtained in the subject detection process (size (number of pixels) of the one side of the face frame FR in the vertical direction (or horizontal direction)) is calculated, and this ratio is set as the zoom magnification Z.

$$Z = \text{size\_trg}/\text{size\_org} \qquad \text{(Equation 1)}$$

That is, the zoom magnification Z is calculated according to the Equation 1.

With respect to FIGS. 9 and 10, since the target subject size is 64 pixels and the subject size obtained in the subject detection process is 32 pixels, the zoom magnification Z becomes Z=64/32=2.

Further, in step S106, the pan-tilt-zoom control block 63 performs the zoom control based on the zoom magnification Z calculated in step S105. With respect to FIGS. 9 and 10, since the zoom magnification Z is Z=2, a control for driving the zoom lens is performed so that the field angle is ½.

In the procedure as shown in FIG. 16, the horizontal offset amount Δx and the vertical offset amount Δy are determined, and then, the pan-tilt control is performed on the basis of the determination result. Thus, firstly, the subject gravity center G is positioned in the target coordinates in the image frame, according to the determined offset amounts Δx and Δy. Then, the zoom control is performed to obtain the target subject size.

Here, in a case where the composition control for obtaining the state in FIG. 10 from the state in FIG. 9, as exemplified above, is actually performed by the procedure in FIG. 16, the composition control is, for example, performed as follows.

Figure 11:
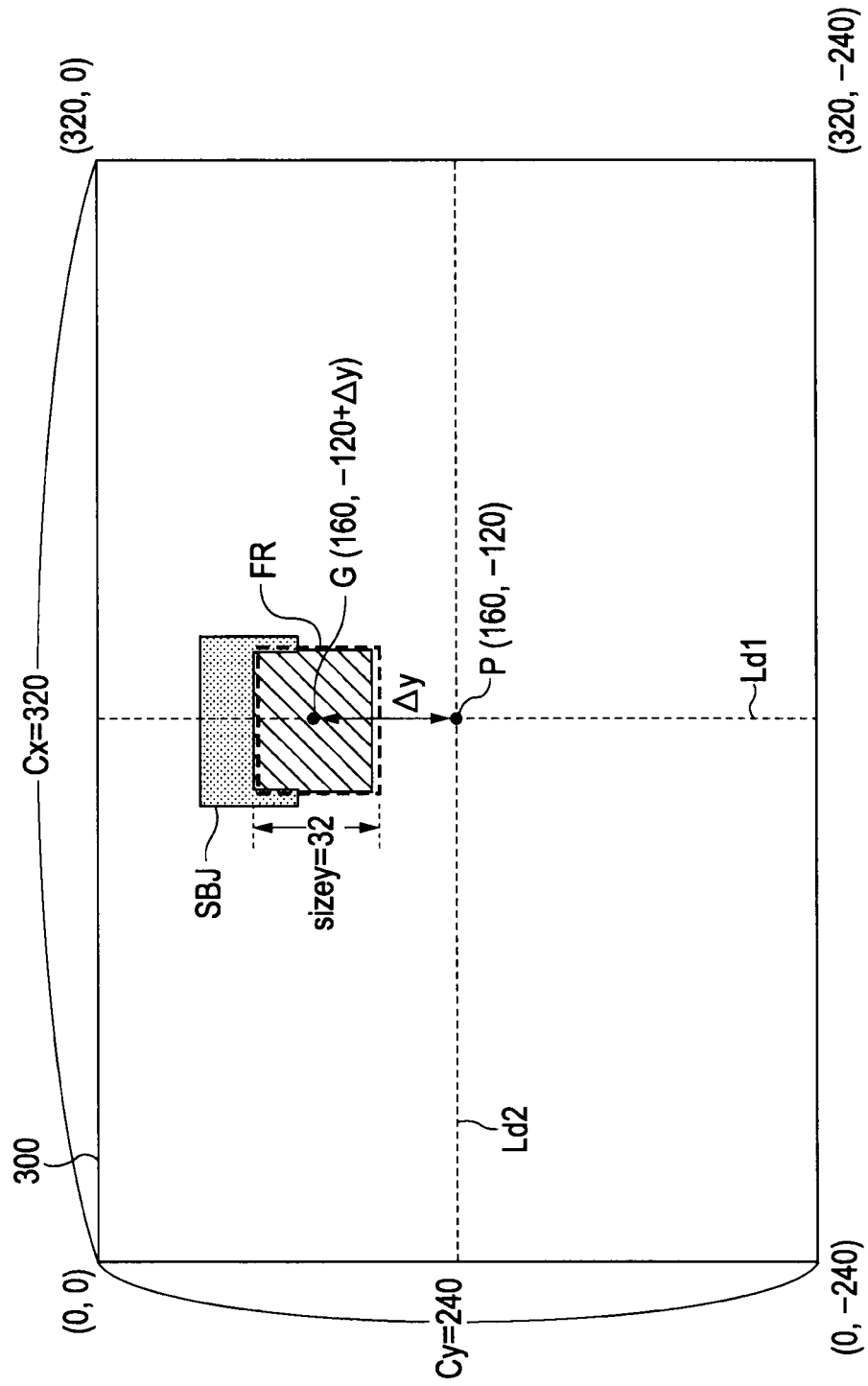
FIG. 11 is a diagram illustrating a position of a subject in an image frame which is obtained in the stage of a pan-tilt control in a composition control according to a first example.

FIG. 11 illustrates a state where the subject gravity center G is positioned in the target coordinates G(160,−120+Δy) by performing steps S101 to S105 from the state in FIG. 9.

Figure 12:
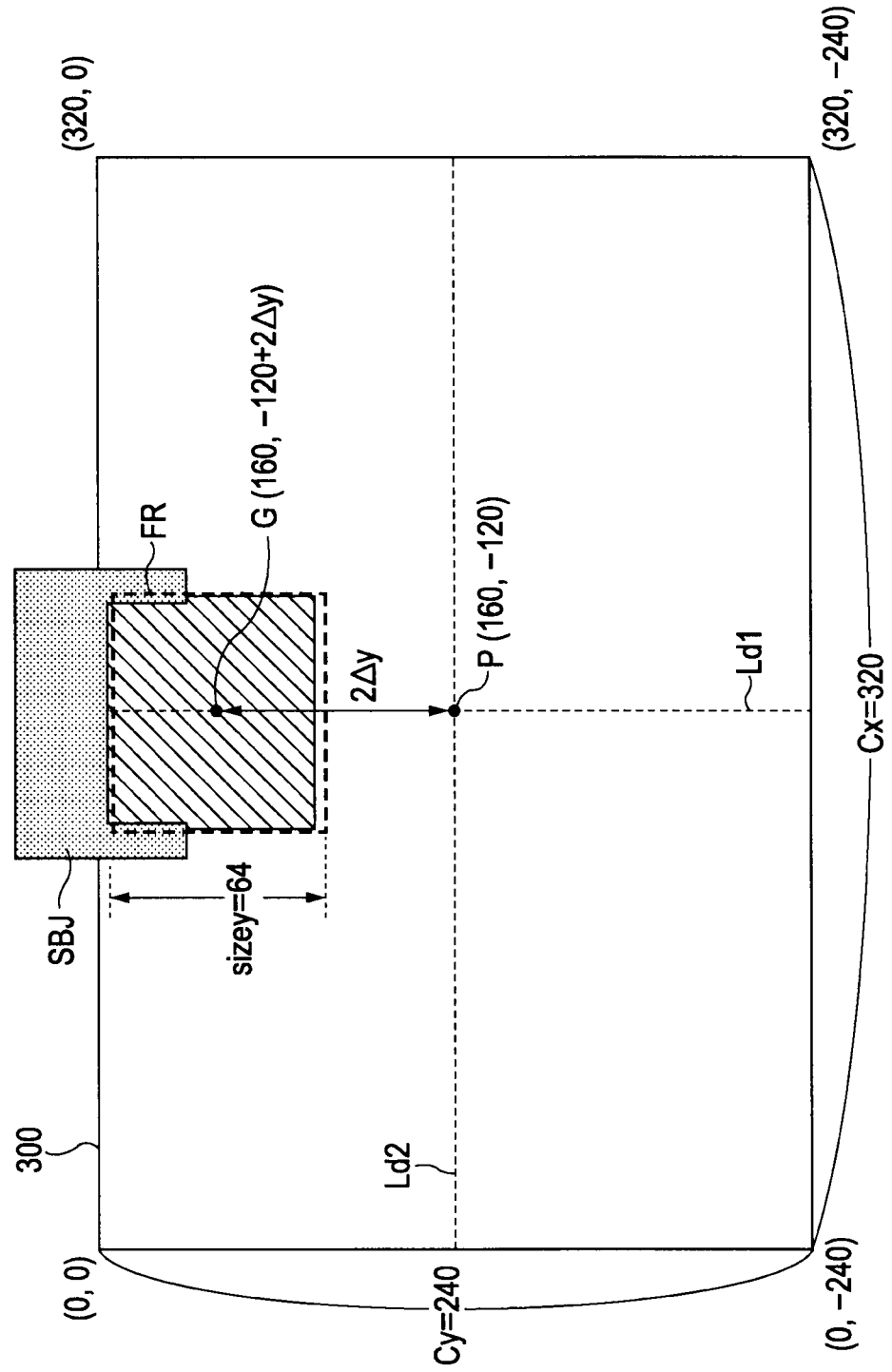
FIG. 12 is a diagram illustrating an example of image content in an image frame which is obtained, in a stage where a zoom control is performed, from the state in FIG. 11.

In the procedure in FIG. 16, in the state as shown in FIG. 11, the zoom control is performed according to the zoom magnification Z=2, but the result is shown in FIG. 12.

That is, in the case where the field angle is changed, the image in the image frame 300 is enlarged or reduced with reference to the reference point P which is the center position of the image frame 300 corresponding to the lens optical axis. Thus, for example, in this case, if the field angle change is performed according to the zoom magnification Z=2 from the state as shown in FIG. 11, as shown in FIG. 12, the coordinates of the subject gravity center G coincide with the vertical reference line Ld1 with respect to the X coordinate and does not move. However, the field angle is enlarged by two times with respect to the Y coordinate, and thus, the coordinates of the subject gravity center G moves to Y=−120+2Δy from Y=−120+Δy. That is, the coordinates of the subject gravity center G are shifted from the target coordinates. As a result, as shown in FIG. 12, the subject SBJ is in the state of protruding upward the image frame 300.

Figure 13:
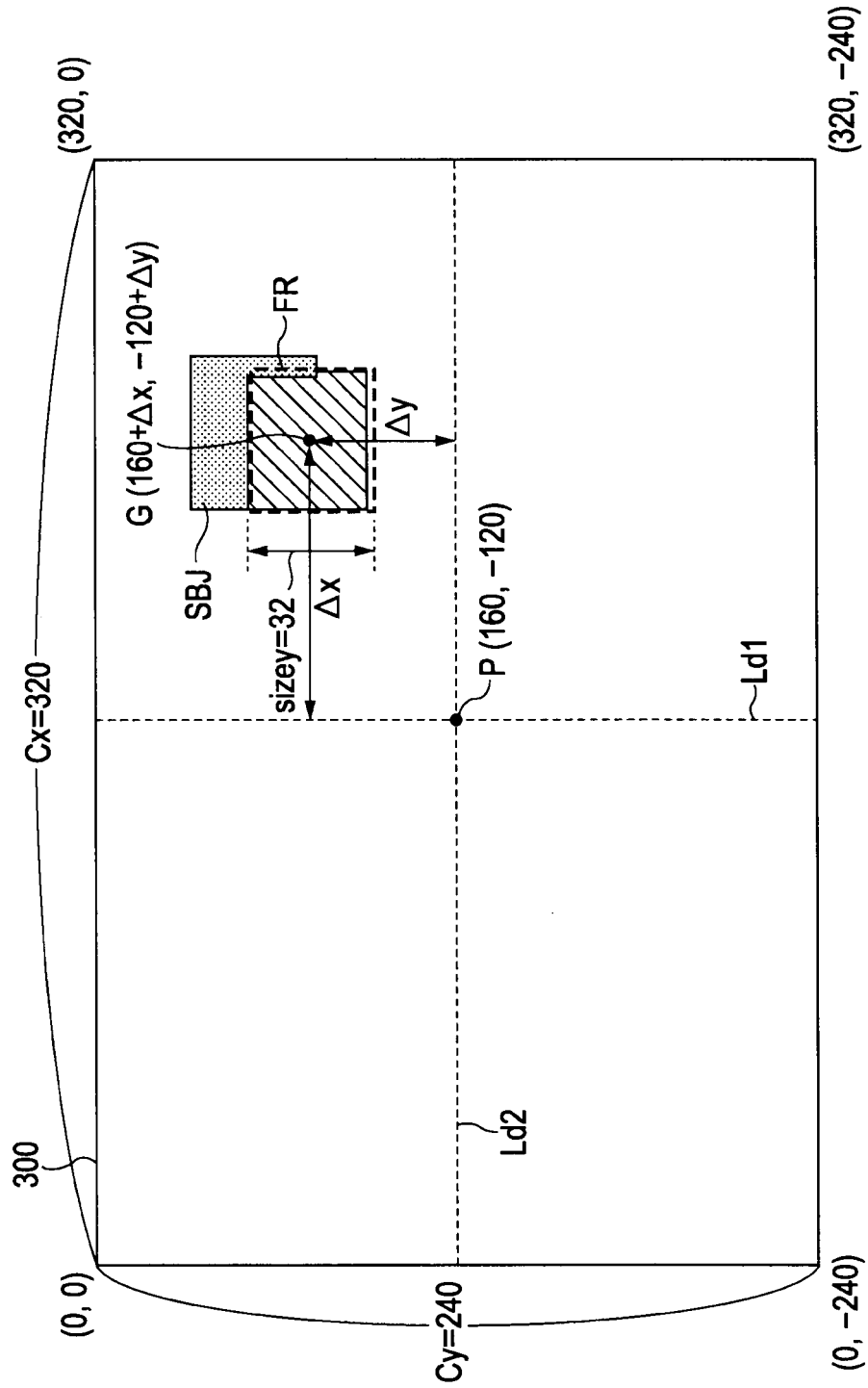
FIG. 13 is a diagram illustrating a position (in a case where a horizontal offset amount is not 0) of a subject in an image frame which is obtained in the stage of a pan-tilt control in a composition control according to a second example.
Figure 14:
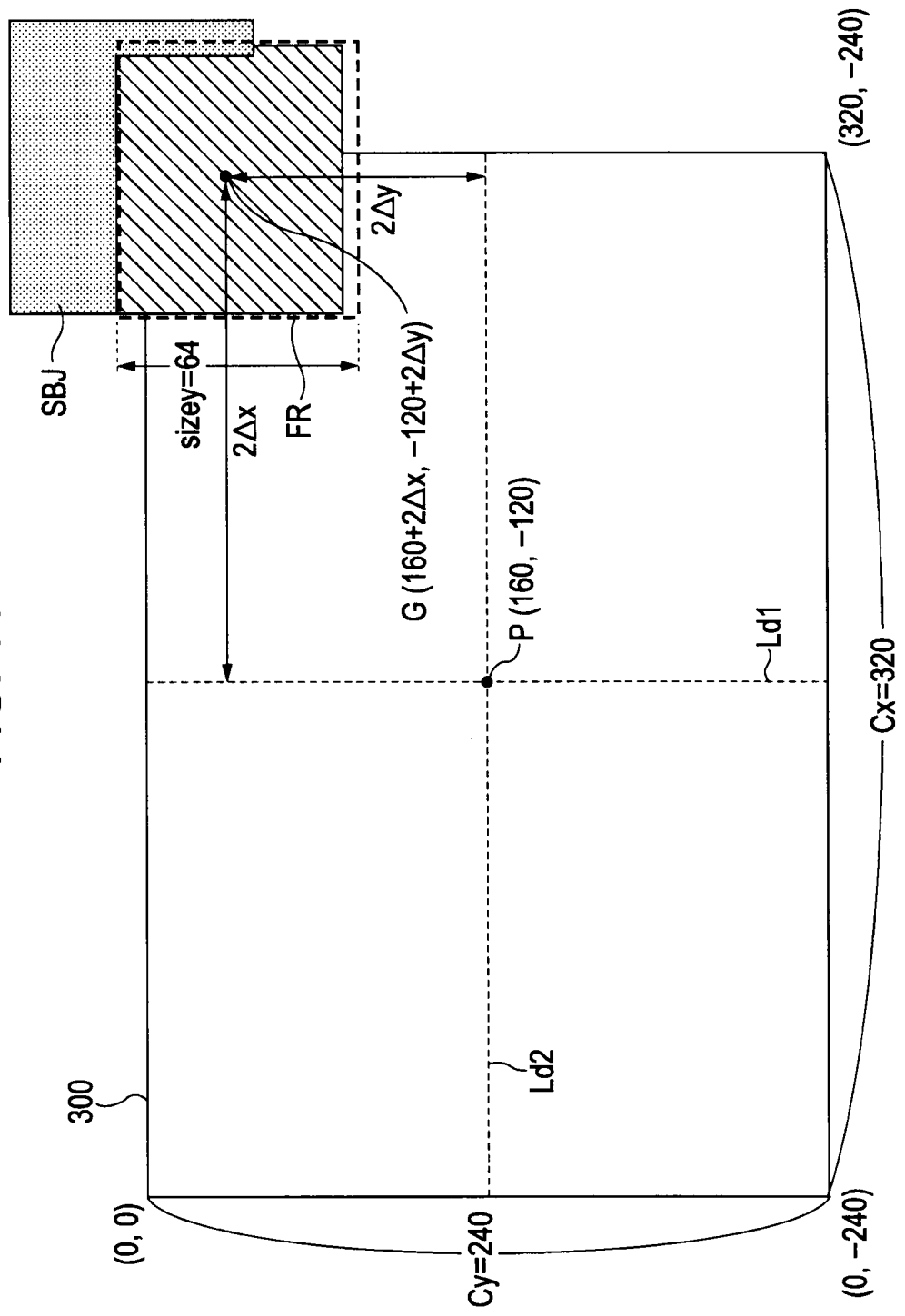
FIG. 14 is a diagram illustrating an example of image content in an image frame which is obtained, in the stage where a zoom control is performed, from the state in FIG. 13.

As shown in FIGS. 13 and 14, this is similarly applied to a case where an absolute value other than 0 is given as the horizontal offset amount Δx.

FIG. 13 is a diagram illustrating image content of the image frame 300 when the subject gravity center G is firstly positioned in the target coordinates, through the processes of steps S101 to S106 in FIG. 16, with respect to the case where the face direction detected with respect to the subject SBJ is the left side.

In the case where the face direction is detected as the left side, as described above, the subject gravity center G in the horizontal direction is set to be positioned in predetermined coordinates in the image area of the right side with reference to the vertical reference line Ld1. Accordingly, the target coordinates of the subject gravity center G are expressed as G(160+Δx, −120+Δy). Further, a positive value is set as the vertical offset amount Δy at that time.

In the procedure as shown in FIG. 16, the zoom control is performed from the state in FIG. 13. The subject size (sizey) in FIG. 13 becomes 32 pixels. Here, if the target subject size is 64 pixels in a similar way to the case in FIG. 10, the zoom magnification becomes Z=2.

Then, if the zoom control is performed according to the zoom magnification Z=2 from the state in FIG. 13, as shown in FIG. 14, a distance from the reference point P of the subject gravity center G is enlarged into 2Δy from Δy in the vertical direction, and is enlarged into 2Δx from Δx in the horizontal direction. That is, the subject gravity center G is moved from (160+Δx, −120+Δy) to (160+2Δx, −120+2Δy), and thus, the subject gravity center G is remarkably shifted from the target coordinates, for example, as shown in FIG. 14, the subject SBJ is in the state of protruding from the right upper side of the image frame 300.

That is, in the procedure as shown in FIG. 16, in the stage where the zoom control is performed, the subject gravity center G is shifted from the target coordinates, and becomes different from the determined composition.

Thus, in practice, after the procedure as shown in FIG. 16, the pan-tilt control for returning the subject gravity center G to the target coordinates is demanded. However, for example, in the case where the subject SBJ (face frame FR) protrudes from the image frame 300 as the zoom control is performed as shown in FIG. 14, the subject may not be detected in this stage, and thus, the procedure may be returned to the control of the subject search.

Such a procedure of the composition control may be considered as unreasonable. Further, a physical movement of the digital still camera 1 according to the actual movement of the pan-tilt mechanism of the camera platform 10 is not performed in a smooth manner, and thus, it is difficult to give a good impression to a user.

4. Composition Control (Second Example)

Figure 17:
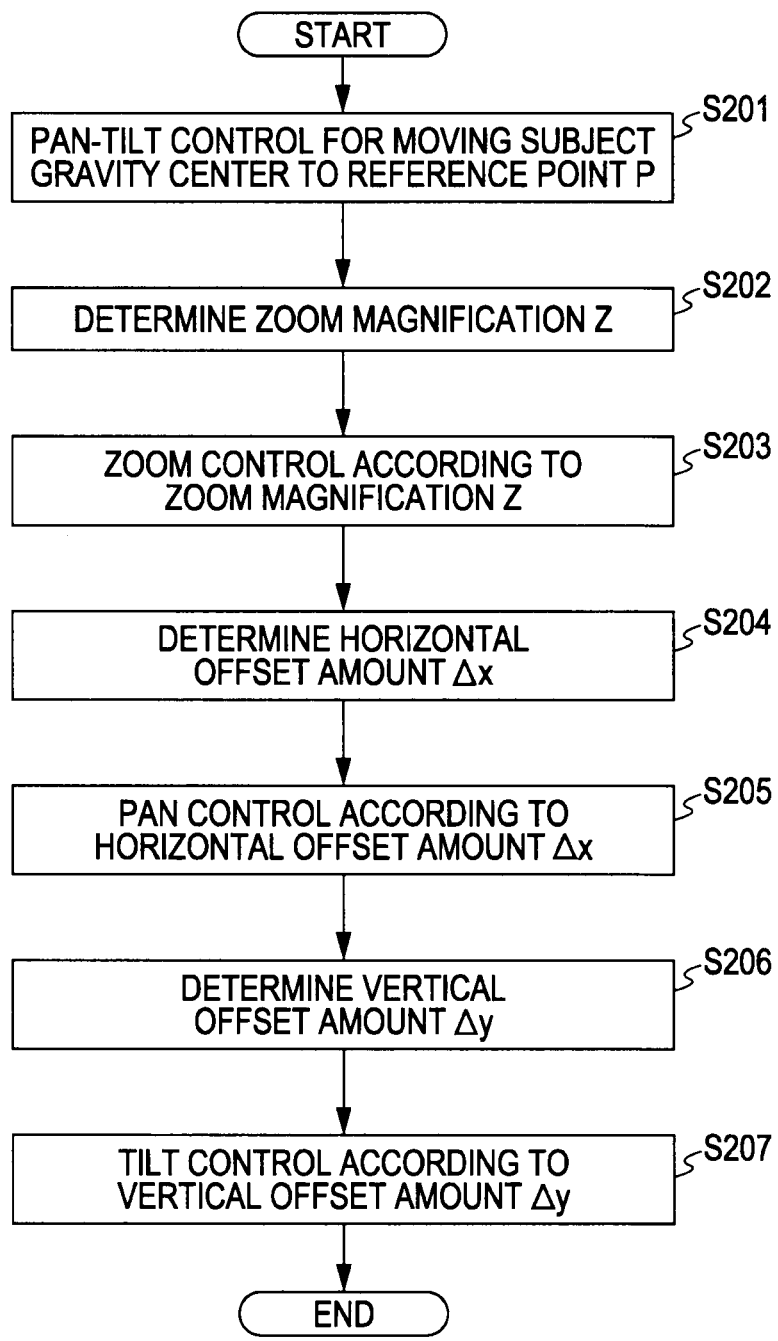
FIG. 17 is a flowchart illustrating an example of a process procedure for a composition control according to a second example.

For example, as a second example, a procedure of the composition control as shown in a flowchart in FIG. 17 may be considered.

The procedure in the figure is also configured to detect the subject through the subject process in the image frame 300, and can be appropriately performed by the composition determination block 62 and the pan-tilt-zoom control block 63.

First of all, the composition determination block 62 performs the pan/tilt control for positioning the subject gravity center G of the detected subject SBJ on the reference point P, in step S201.

Next, the composition determination block 62 determines the zoom magnification Z in step S202 and performs the zoom control according to the zoom magnification Z in step S203.

Then, the composition determination block 62 and the pan-tilt-zoom control block 63 determine the horizontal offset amount Δx and perform the pan control on the basis of the horizontal offset amount Δx; and determine the vertical offset amount θy and perform the tilt control on the basis of the vertical offset amount θy, in a similar way to steps S101 to S106 in FIG. 16, in steps S204 to S207.

According to such a procedure of the composition control, firstly, since the subject gravity center G is positioned on the reference point P and then the pan-tilt control is performed, as long as the zoom magnification Z is appropriate, the face frame of the subject SBJ does not protrude from the image frame 300. Further, the pan-tilt control is performed so that the subject gravity center G is positioned in the target coordinates from this stage, to thereby obtain the determination composition.

However, in the procedure of the second example, after the zoom control, the pan-tilt control for positioning the subject gravity center G in the target coordinates in the image frame is performed.

The zoom magnification Z may be frequently set as a positive value which is larger than 1, as described with reference to FIGS. 9 to 14, to obtain a composition in which the subject seems to be in a close-up state.

Further, if the control for positioning the subject gravity center G in the target coordinates is, for example, the pan control, the composition determination block 62 gives a pan direction movement instruction with respect to the camera platform 10 so that the subject gravity center G is moved to be close to the target X coordinate in the horizontal direction. Further, in the image frame of the imported captured image data, at a timing when it is determined that the subject gravity center G coincides with the target X coordinate, the composition determination block 62 gives an instruction for stopping the pan directional movement with respect to the camera platform 10. Similarly, in the case of the tilt control, the composition determination block 62 gives a tilt direction movement instruction with respect to the camera platform 10 so that the subject gravity center G is moved to be close to the target Y coordinate in the vertical direction. Further, at a timing when the subject gravity center G coincides with the target Y coordinate, the composition determination block 62 gives an instruction for stopping the tilt directional movement with respect to the camera platform 10.

However, it is natural that, if the digital still camera 1 slightly moves in the pan or tilt direction, as the zoom magnification becomes large, the movement amount of the captured image in the image frame becomes large. This means that it is difficult to precisely perform the pan-tilt control for enabling the subject gravity center G to coincide with the target coordinates, according as the image is in a large zoom magnification state. That is, in the procedure as shown in FIG. 17, it may be difficult to correctly arrange the subject in the position in the image frame according to the determined composition with the zoom magnification. At this time, for example, an excessively long time is taken until the subject is located in an appropriate position, the movement of the digital still camera 1 by means of the pan-tilt mechanism at that time hardly gives a good impression to a user.

5. Composition Control (Third Example: an Embodiment)

5-1. Example of Algorithm

In the present embodiment, a composition control according to a third example will be described hereinafter.

Figure 18:
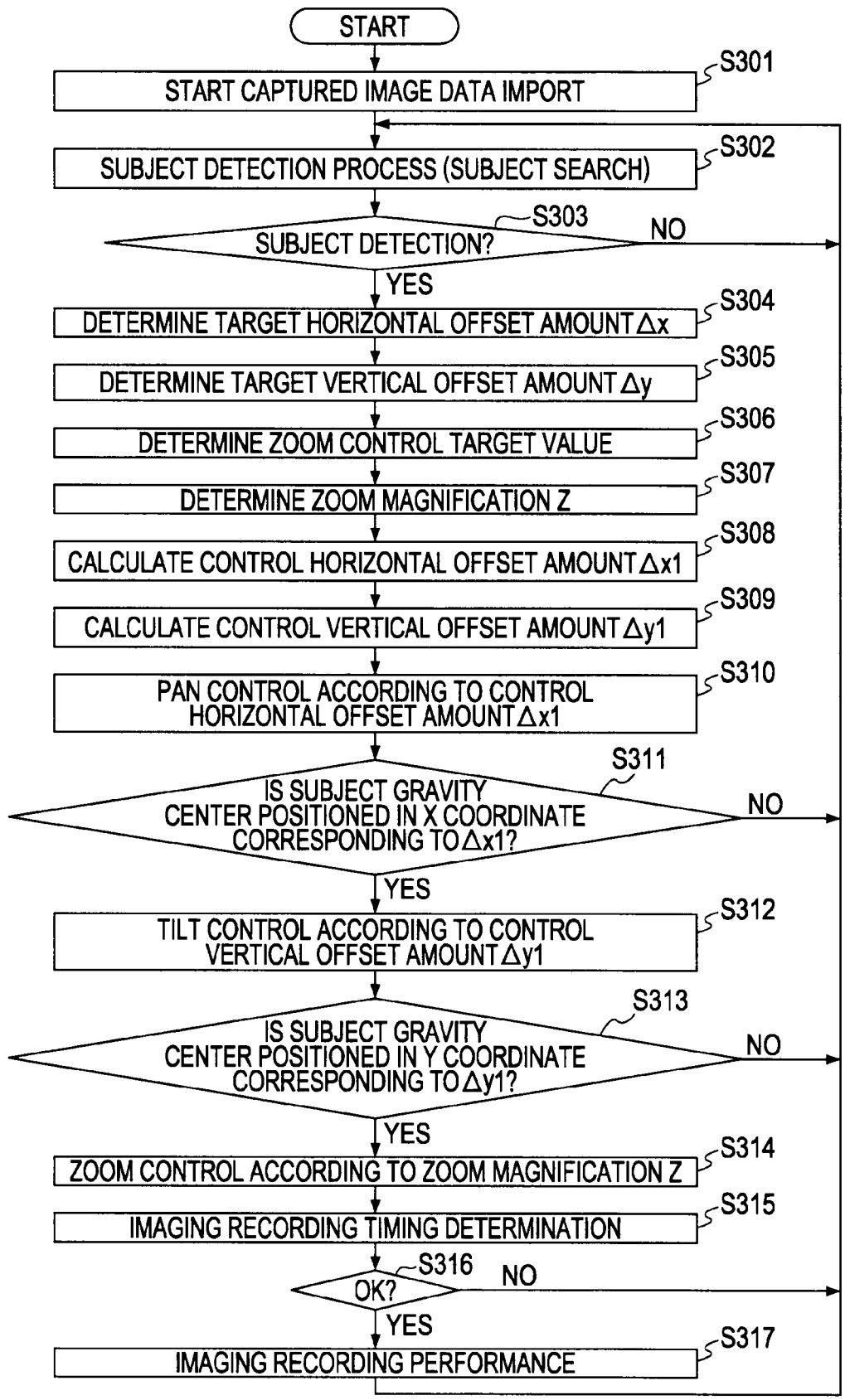
FIG. 18 is a flowchart illustrating an example of a process procedure for a composition control according to a third example.

FIG. 18 is a flowchart illustrating an example of an algorithm for the composition control according to the third example. FIGS. 16 and 17 illustrate the example of the procedure of the composition control after the subject is detected in the image frame 300 by means of the subject process. In FIG. 18, an example of a process procedure including the subject detection (subject search process) is illustrated.

Further, the processes as shown in the figure may be appropriately performed by means of the respective functional sections of the digital still camera 1 as shown in FIG. 8 as necessary. Further, the procedure which is performed by the respective functional sections can be considered as a procedure of controls and processes realized as the controller (CPU) 27 and the signal processing section 24 as the DSP in FIG. 1 execute a program (instruction).

Such a program may be written and stored in a ROM or the like at the time of manufacturing or the like, or may be stored in a removable storage medium and then may be installed (including updating) from the removable storage medium to a non-volatile storage area corresponding to the DSP, the flash memory 30 or the like, for storage. Alternatively, the program installation may be performed under the control of other host devices, through a data interface. Alternatively, the program may be stored in a storage device of a server or the like on a network, and then may be downloaded from the server, by providing a network function to the digital still camera 1.

In FIG. 18, firstly, in step S301, by means of the composition determination block 62 (signal processing section 24), importing (input) of the captured image data obtained at that time in the imaging recording block 61 starts.

In the next step S302, the composition determination block 62 (signal processing section 24) performs the subject detection process using the imported captured image data.

As the subject detection process, for example, the face detection technique is employed as described above, and as a result, the face frame FR is set with respect to the image region area of the face of every detected subject, as described thus far. For example, basic information about the subject such as the number of the subjects, or the size of the subjects and the position of subjects in the image frame at the time of the subject detection, can be obtained by the number, size, position or the like of the face frames FR. Further, as the image frame FR is set, the subject gravity center G of the subject is obtained at this stage.

In step S303, the composition determination block 62 determines whether the subject is detected by means of the subject detection process in step S302. In a case where a negative determination result is obtained, the procedure returns to step S302, and then, the subject detection process for searching the subject is performed. In this respect, the subject search refers to a state where the control of the movement of the camera platform 10 in the pan/tilt directions is performed in the digital still camera 1 and the zoom control is performed, so as to change the imaging view range, and thus, the captured image data in which the subject is present is obtained.

In a case where a positive determination result that the subject is detected is obtained in step S303, the procedure goes to step S304.

In step S304, the composition determination block 62 determines a target horizontal offset amount $\Delta x$ according to a predetermined determination algorithm, with respect to the detected subject. Further, in step S305, a target vertical offset amount $\Delta y$ is determined according to a predetermined determination algorithm, with respect to the detected subject.

The target horizontal offset amount $\Delta x$ and the target vertical offset amount $\Delta y$ each correspond to the horizontal offset amount $\Delta x$ and the vertical offset amount $\Delta y$ determined in steps S101, S204, S103 and S206 in FIGS. 16 and 17, in the first example and the second example. That is, the subject gravity center G corresponding to the determined composition represents distances from the reference point P in the horizontal/vertical directions corresponding to coordinates to be finally positioned.

Subsequently, in step S306, the composition determination block 62 determines a zoom control target value. For example, the zoom control target value becomes the size_trg which is the vertical size of the face frame FR which is the subject size in the composition which is to be obtained as shown in FIG. 10, with respect to the description according to the first and second examples.

In the next step S307, the composition determination block 62 determines the zoom magnification Z using the zoom control target value determined in step S306. For determination of the zoom magnification Z, with respect to the description according to the first and second examples, the zoom magnification Z is calculated by the Equation 1, using the zoom control target size_trg, and the vertical size size_org of the face frame FR of the subject SBJ at the time of the detection by means of the subject detection process.

Further, in this case, the composition determination block 62 calculates a horizontal control offset amount $\Delta x1$ and a vertical control offset amount $\Delta y1$, respectively, in steps S308 and S309.

The horizontal control offset amount $\Delta x1$ represents a distance with respect to the vertical reference line Ld1, for positioning the subject gravity center G by actually performing panning by the pan control in steps S310 and S311 which will be described later. Similarly, the vertical control offset amount $\Delta x2$ represents a distance with respect to the horizontal reference line Ld2, for positioning the subject gravity center G by actually performing tilting by the tilt control in steps S312 and S313 which will be described later.

Firstly, the horizontal control offset amount $\Delta x1$ is calculated on the basis of the target horizontal offset amount $\Delta x$ and the zoom magnification Z, for example, as follows.

$$\Delta x1 = \Delta x/Z \quad \text{(Equation 2)}$$

Further, the control vertical offset amount $\Delta y1$ is calculated on the basis of the target vertical offset amount $\Delta y$ and the zoom magnification Z, for example, as follows.

$$\Delta y1 = \Delta y/Z \quad \text{(Equation 3)}$$

The control horizontal offset amount $\Delta x1$ and the control vertical offset amount $\Delta y1$ which are calculated according to the Equation 2 and the Equation 3 may correspond to the horizontal offset amount $\Delta x$ and the vertical offset amount $\Delta y$ which are obtained when the state where the determination composition as shown in FIG. 10 is obtained is returned to the state before the enlargement by the zoom magnification Z.

In other words, if the subject gravity center G is located in advance in the coordinate position according to the control horizontal offset amount $\Delta x1$ and the control vertical offset amount $\Delta y1$, and the zoom due to the zoom magnification Z is performed, as a result, the subject gravity center G can be located in the coordinates according to the target horizontal offset amount $\Delta x$ and the target vertical offset amount $\Delta y$.

In addition, the pan-tilt-zoom control block 63 performs the pan control so that the subject gravity center G is located in the X coordinate corresponding to the control horizontal offset amount $\Delta x1$ in the next step S310. To this end, the subject search processing block 61 instructs the pan direction and commands driving of the pan mechanism section 53 through the communication control processing block 63, so that the subject gravity center G moves to be close to the X coordinate corresponding to the control horizontal offset amount $\Delta x1$ with respect to the controller 51 of the camera platform 10.

Further, the composition determination block 62 determines whether a state where the subject gravity center G is located in the X coordinate corresponding to the control horizontal offset amount Δx1 is obtained, for example, in step S311, while performing the pan control. As a result of the pan control, if the subject gravity center G is located in the X coordinate corresponding to the control horizontal offset amount Δx1, the procedure goes to step S312.

In this respect, for example, if the subject gravity center G is not located in the X coordinate corresponding to the control horizontal offset amount Δx1, even though a predetermined time is elapsed, for example, because a person which is the subject moves during the pan control, the procedure returns to the subject detection process (subject search process) in step S301.

In step S312, the pan-tilt-zoom control block 63 determines whether a state where the subject gravity center G is located in the Y coordinate corresponding to the control vertical offset amount Δy1 is obtained in step S313, while performing the tilt control so that the subject gravity center G is located in the Y coordinate corresponding to the control vertical offset amount Δy1. As a result of the tilt control, if a positive result that the subject gravity center G is located in the Y coordinate corresponding to the control vertical offset amount Δy1 is obtained, the procedure goes to step S314. If a negative result is obtained, the procedure returns to step S302.

In step S314, the subject gravity center G of the subject SBJ which is detected with respect to step S303 is positioned in the X and Y coordinates corresponding to the control horizontal offset amount Δx1 and the control vertical offset amount Δx2 in the image frame 300.

Further, the composition determination block 62 performs the zoom control according to the zoom magnification Z which is determined in step S307, in the next step S314. The zoom control according to the zoom magnification Z may be performed by performing the camera control with respect to the optical system so that the zoom lens is moved, for example, in accordance with the movement of the zoom magnification Z.

The third example is in the state where the determination composition including the elements of the coordinates of the subject gravity center G and the subject size is obtained in the image frame 300 according to the control thus far, detailed description of which will be made later.

Further, in this case, the composition determination block 62 waits for a timing for imaging recording, in the state where the composition as determined, for example, with respect to the image content of the captured image data obtained in step S315.

For example, the digital still camera 1 according to the present embodiment can detect at least a smiling face as facial expressions of the detected subject. Further, for example, at the timing when it is detected that the detected subject is the smiling face, a mode in which the imaging recording is to be performed is preset according to a user operation or the like. In step S315, for example, according to a photographing mode for such a smiling face, it is determined whether it is a timing to perform photography recording. That is, it is determined whether the expression of the subject which is detected in the captured image data which is currently obtained is a smiling face.

In step S316, the composition determination block 62 determines whether the imaging recording timing is OK.

For example, in a determination process period of the recording timing which is performed in step S316, the expression of the detected subject is detected as the smiling face. Then, a positive determination result is obtained in step S109, the procedure goes to step S317. On the other hand, if the expression of the detected subject is not detected as the smiling face even though the determination process period of the recording timing elapses, a negative determination result is obtained in step S109. In this case, the procedure returns to step S302, and then, the subject detection process including the subject search is performed.

In step S317, for example, the composition determination block 62 performs the imaging recording by the imaging recording block 61. Accordingly, in the imaging recording block 61, the captured image data which is obtained at that time is recorded as a still image file with respect to the memory card 40.

As an actual example corresponding to the processes as shown in FIG. 18, it is assumed that the subject SBJ as shown in FIG. 9 is detected according to the subject detection process. Further, in this case, the composition which is to be obtained according to the subject SBJ as shown in FIG. 9 corresponds to the composition as shown in FIG. 10. However, for simplicity of description, the subject size (sizey) which is detected by the subject detection process is expressed as sizey=40 as indicated by a round bracket ( ) in FIG. 9.

In this case, the zoom control target value in step S306 is determined as sizey=64 as shown in FIG. 10. Further, in step S307, for example, the zoom magnification is calculated as Z=size_ trg/size_org=1.6 according to the Equation 1.

In this respect, the control horizontal offset amount Δx1 and the control vertical offset amount Δy1 are calculated by operations of Δx1=Δx/1.6 and Δy1=Δy/1.6, using the Equation 2 and the Equation 3. To obtain the composition as shown in FIG. 10, since the target horizontal offset amount Δx=0, the control horizontal offset amount Δx1=0 is calculated according to the Equation 2. Further, if the target vertical offset amount Δy=40, the control vertical offset amount Δy1=40/1.6=25 is obtained.

The X coordinate corresponding to the target horizontal offset amount Δx=0 becomes 160+0=160. Further, the Y coordinate corresponding to the target vertical offset amount Δy=25 becomes −120+25=−95. Thus, the composition determination block 62 moves the subject gravity center G so that the X coordinate of the subject gravity center G becomes 160 in steps S310 and S311, and moves the subject gravity center G so that the Y coordinate of the subject gravity center G becomes −95 in steps S310 and S311.

Figure 15:
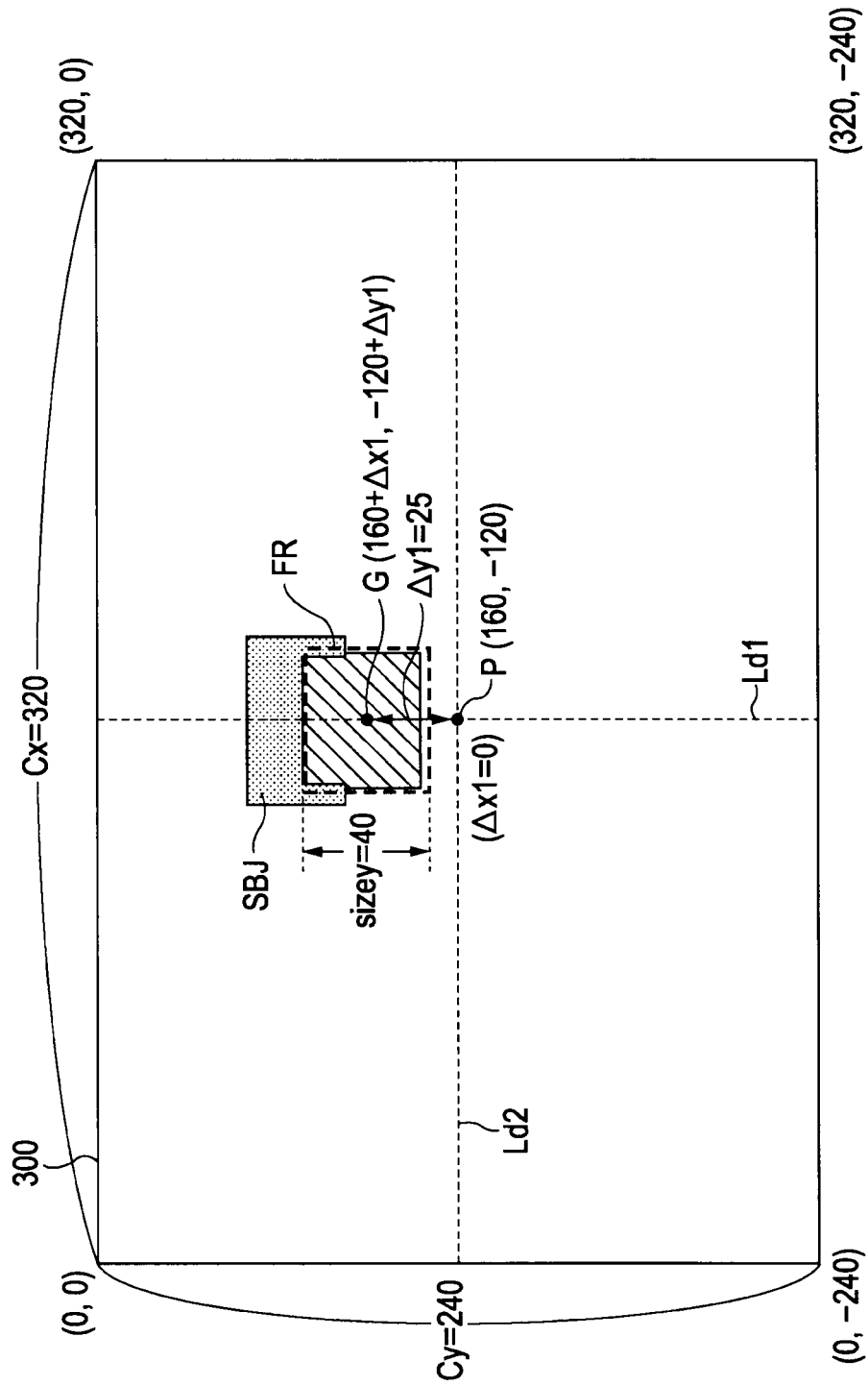
FIG. 15 is a diagram illustrating an example of a position of a subject in an image frame which is obtained in the stage of a pan-tilt control in a composition control according to a third example.

In this way, the image content of the image frame 300 in the state where the control is performed up to step S313, is shown in FIG. 15.

The subject SBJ in the state where the control up to step S313 in the figure is performed, coordinates of the subject gravity center G are expressed as (160+Δx1, −120+Δy1). In this case, since Δx1=0 and Δy1=−25, the subject gravity center G(160,−95) is obtained.

Further, in the state as shown in FIG. 15, the zoom control according to the zoom magnification Z=1.6 in step S314 is performed. Thus, as shown in FIG. 10, the subject size(sizey) is enlarged into a size 64 from sizey=40. Further, with respect to the subject gravity center G, according to the enlargement of the image, the X coordinate thereof moves to a position expressed as (160+Δx1·1.6), the Y coordinate thereof moves to a position expressed as (−120+Δy1·1.6). That is, as shown in FIG. 10, the coordinates of the subject gravity center G become (160+Δx, −120+Δy), according to the target horizontal offset amount Δx and the target vertical offset amount Δy. Specifically, since Δx=0 and Δy=40 in the example, the subject gravity center G(160,−80) is obtained. Further, this means that the determined composition is obtained in the stage where the zoom control in step S314 is completed.

In this way, in the third example according to the present embodiment, the control horizontal offset amount Δx1 and the control vertical offset amount $\Delta y1$ are calculated, on the basis of the zoom magnification Z, the target horizontal offset amount $\Delta x$, and the target vertical offset amount $\Delta y$ which are the determination composition elements. Further, with respect to the coordinates (preliminary coordinates) which are determined by the control horizontal offset amount $\Delta x1$ and the control vertical offset amount $\Delta y1$, the subject gravity center G is preliminarily positioned.

As described above, the control horizontal offset amount $\Delta x1$ and the control vertical offset amount $\Delta y1$ are values obtained by an inverse operation, using the target horizontal offset amount $\Delta x$ and the target vertical offset amount $\Delta y$ obtained at the time when the zoom control according to the zoom magnification Z is completed. Accordingly, if the zoom control according to the zoom magnification Z is performed in a state where the subject gravity center G is located in the preliminary coordinates, as a result, a state where the subject gravity center G is located in the target coordinates determined by the target horizontal offset amount $\Delta x$ and the target vertical offset amount $\Delta y$ is obtained.

In the composition control of such a third example, firstly, in a similar way to the first example, as a result of the zoom control, the subject gravity center G is not significantly shifted from the target coordinates.

Further, the pan-tilt control for moving the subject gravity center G in the image frame is performed in a preliminary stage of the zoom control. Accordingly, compared with the second example, the subject gravity center G is correctly and easily located in the preliminary coordinates, and the accuracy thereof becomes high. Thus, an intended composition is more precisely obtained.

5-2. Case where the Number of Subjects is Plural

In the description in FIGS. 9 to 15, for simplicity and clarity of description, the case where the subject detected in the image frame 300 is one is exemplified.

However, the composition control according to the present embodiment can be also applied to a case where the number of the detected subjects is plural.

For example, although not shown, in the case where the number of the detected subjects is plural, an image region which includes the plurality of detected subjects is considered as one total subject, and one subject gravity center (total subject gravity center) Gt is calculated with the total subject being as a target. Further, the total subject gravity center Gt is handled as the subject gravity center G in the above description thus far, and for example, the processes as shown in FIG. 18 may be performed.

There are several methods for setting the total subject gravity center Gt, but as the simplest example, a midpoint on a line segment which connects the gravity centers of the subjects which are positioned in opposite sides of the leftmost side and the rightmost side of the image frame 300, among the respective detected subjects, may be set as the total subject gravity center Gt.

Further, when the number of the subjects is plural, the face directions which are detected for the individual subjects may be different. In this case, on the basis of the relationship of the face directions detected for the plurality of individual subjects, one face direction as the total subject may be determined. When the number of the same face directions occupies a predetermined ratio or more in the total number of the individual subjects, as the relationship between the face directions which are detected with respect to the plurality of individual subjects, the same face directions are determined as the face direction of the total subjects, which is used for the composition determination.

Further, in the case where the number of the subjects is plural, for example, the zoom magnification Z can be determined as follows.

Figure 19:
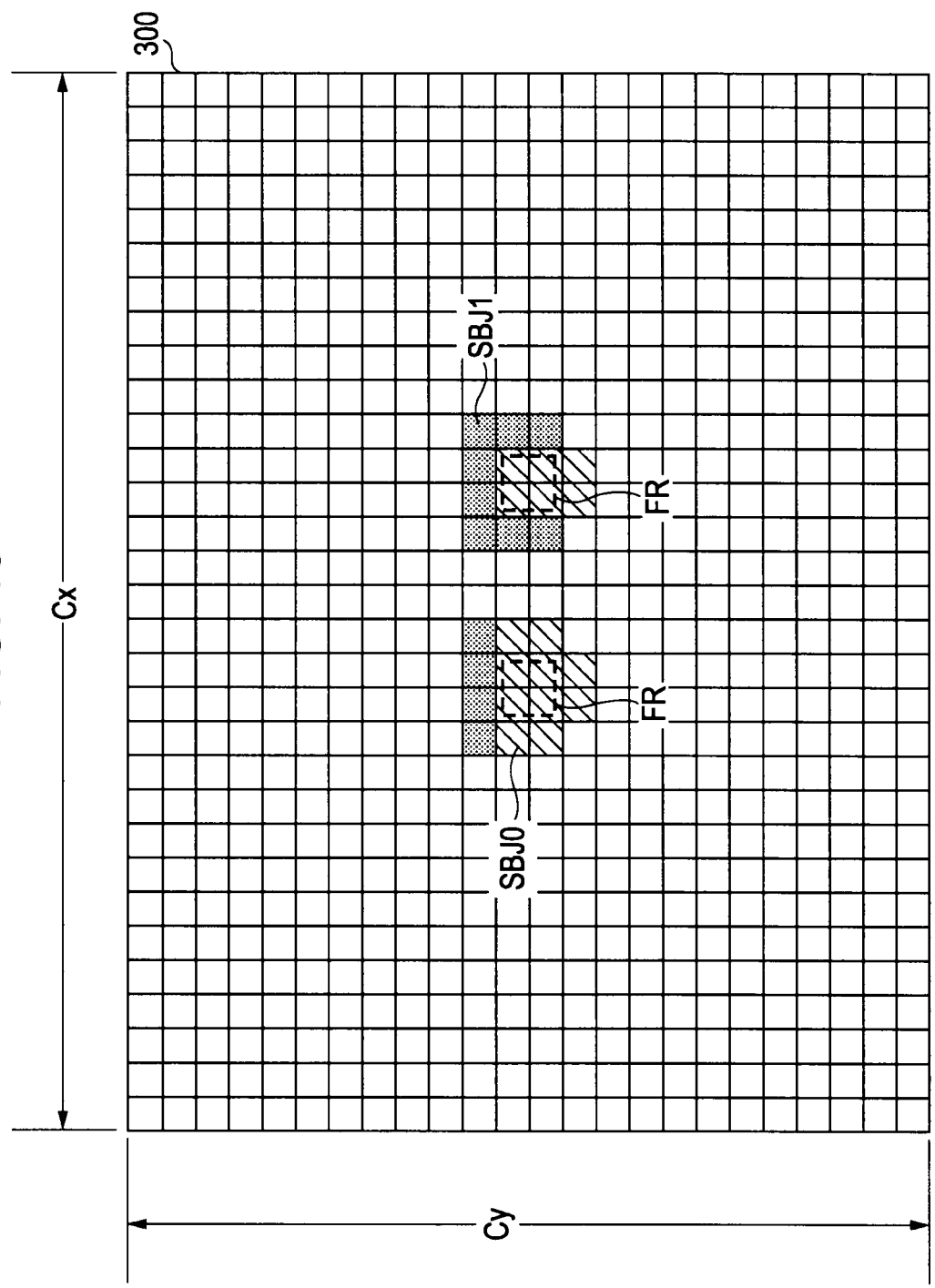
FIG. 19 is a diagram illustrating an example of a determination technique of a zoom magnification Z in a case where the number of subjects is plural.

FIG. 19 illustrates a state where two subjects SBJ0 and SBJ1 are detected in the image frame 300.

For example, sizes of the subjects SBJ0 and SBJ1 at the time of the detection, as shown in FIG. 19, are too small to satisfy the optimal composition. Thus, in this case, the enlargement ratio for enlarging the subjects SBJ0 and SBJ1 up to an appropriate size is set according to the composition determination process. The enlargement ratio is set with respect to the image obtained by imaging, and thus, corresponds to the zoom magnification Z in the composition control according to the present embodiment.

Figure 20:
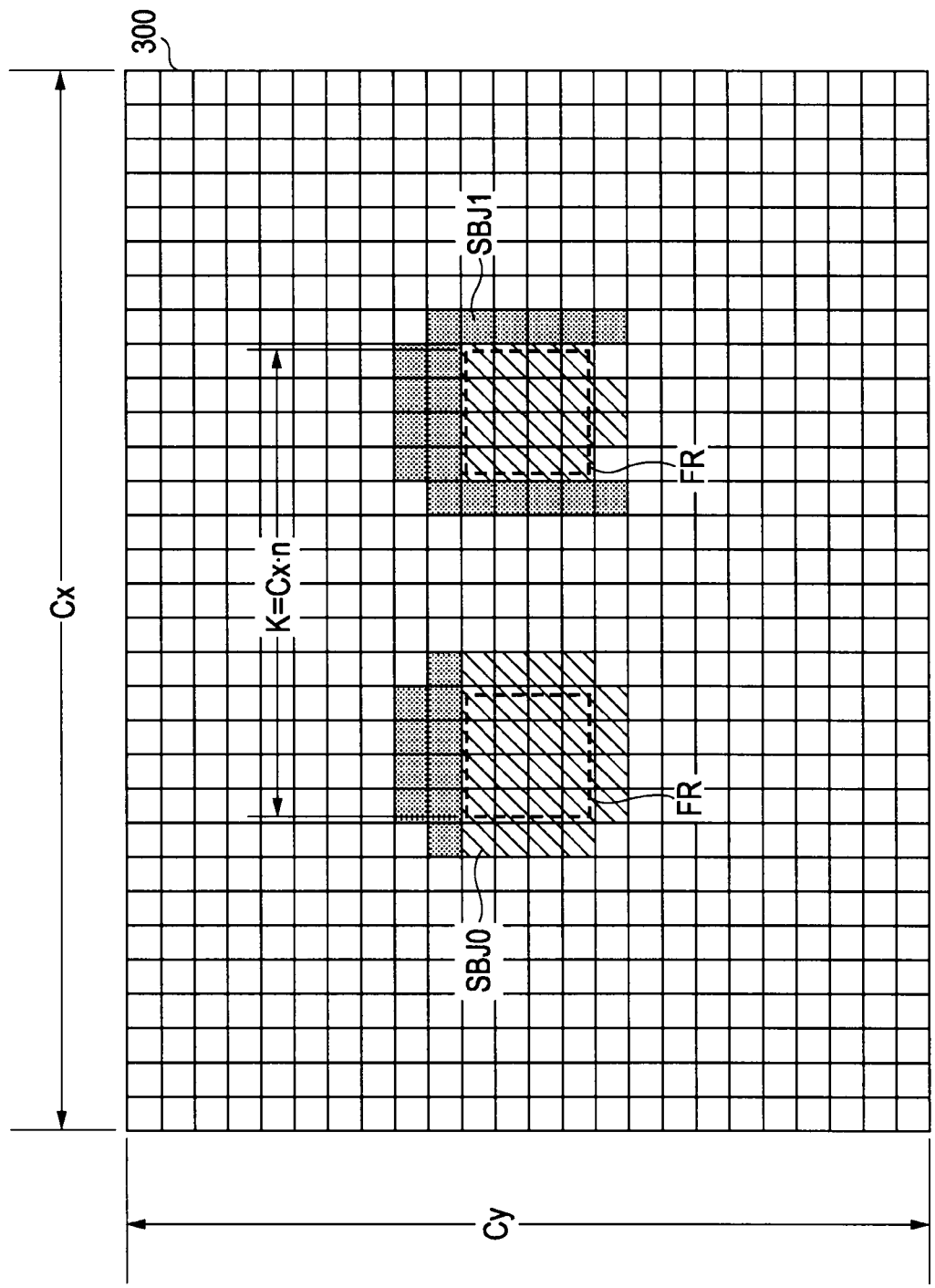
FIG. 20 is a diagram illustrating an example of a determination technique of a zoom magnification Z in a case where the number of subjects is plural.

Next, FIG. 20 is a diagram illustrating image content which is obtained by performing the zoom control as the composition framing control according to the enlargement ratio which is set under the image content as shown in FIG. 19.

The image content as shown in FIG. 20 has a good position relationship from the viewpoint that the subject is arranged in the transverse direction. In such a case, the distance between the face frame FR of the subject in the leftmost side and the face frame FR of the subject in the rightmost side is obtained as a horizontal (transverse) size K of the total subject.

In this case, an appropriate subject size is defined as a size at the time when the horizontal size K of the total subject occupies a predetermined ratio (occupancy) n (0<n<1) with respect to the number Cx of horizontal pixels in the image frame 300. That is, the enlargement ratio may be set so that the relationship of $K=Cx \cdot n$ is obtained. In this example, $K=Cx \cdot n$ becomes the zoom target value determined in step S306 in FIG. 18.

Further, for example, if a horizontal size of the total subject at the time of the subject detection, which is obtained corresponding to the case in FIG. 19, is expressed as K1, and a horizontal size (the number of pixels) of the total subject after the composition control, which is obtained corresponding to the case in FIG. 13, is expressed as K2, and that the enlargement (here, the enlargement is treated as length), that is, the zoom magnification is expressed as Z, since $K2=K1 \times Z$, the zoom magnification Z can be calculated according to the following Equation 4.

$$Z=Cx \cdot n/K1 \qquad \text{(Equation 4)}$$

A result which is obtained by performing the zoom control according to the zoom magnification Z which is calculated in this way in the state as shown in FIG. 19, is shown in FIG. 20.

6. Modified Example of Imaging System According to the Present Embodiment

Figure 21:
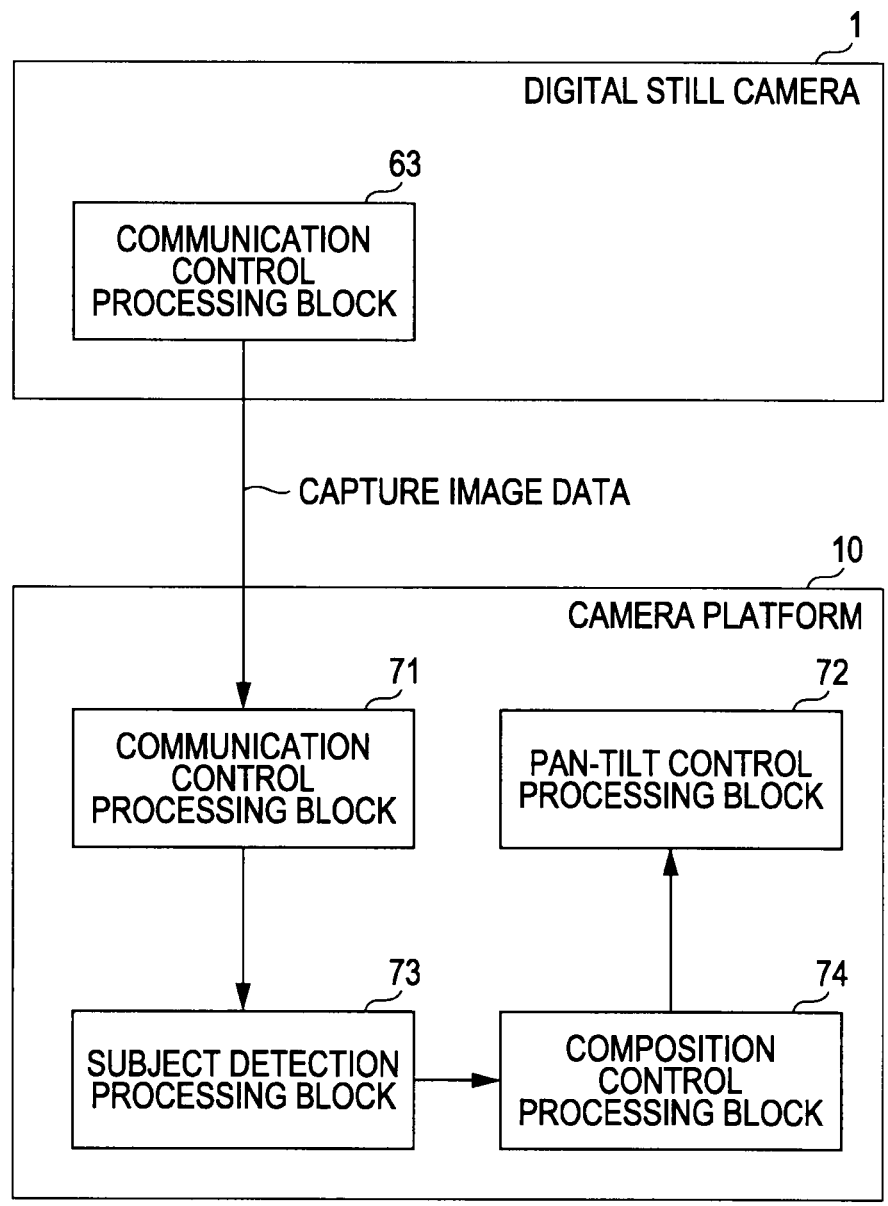
FIG. 21 is a diagram illustrating a configuration example of a modified example of an imaging system according to an embodiment of the invention.

FIG. 21 is a diagram illustrating a configuration example of a modified example of the imaging system according to the embodiment of the invention as shown in FIGS. 7 and 8.

In the figure, the captured image data which is generated in the signal processing section 24 on the basis of the imaging is transmitted to the camera platform 10, through the communication control processing block 63 from the digital still camera 1.

In the figure, a configuration in which the communication control processing block 71, the pan-tilt control processing block 72, the subject detection processing block 73 and the composition control processing block 74 which are included in the camera platform 10 is illustrated.

The communication control processing block 71 is a functional section corresponding to the communication section 52 as shown in FIG. 7, and is configured so that the communication process with respect to the communication control processing block 63 (camera corresponding communication section 34) of the digital still camera 1 is performed on the basis of a predetermined protocol.

The captured image data which is received by the communication control processing block 71 is transmitted to the subject detection processing block 73. The subject detection processing block 73 is provided with a signal processing section which is capable of performing at least a subject detection process equivalent to the composition determination block 62 as shown in FIG. 8. The subject detection processing block 73 performs the subject detection process using the imported captured image data as a target, and outputs the detection information to the composition control processing block 74.

The composition control processing block 74 can perform a composition control equivalent to the composition control processing block 62 in FIG. 8, and when the pan control and the tilt control are performed according to the result of the composition control process, a control signal is output to the pan-tilt control processing block 72.

The pan-tilt control processing block 72 corresponds, for example, to the function of performing the process relating to the pan-tilt control among the control process which is performed y the controller 51 in FIG. 7, and outputs a signal for controlling the movement of the pan mechanism section 53 and the tilt mechanism section 56 according to the input control signal to the pan driving section 55 and the tilt driving section 58. Thus, the composition which is determined by the composition control processing block 62 is obtained to thereby perform the panning and tilting.

In this way, the imaging system as shown in FIG. 21 is configured so that the captured image data is transmitted to the camera platform 10 from the digital still camera 1, and then the subject detection process and the composition control are performed on the basis of the imported captured image data in the camera platform 10.

In the case where the zoom control can be performed, for example, the composition control block 74 is configured to instruct the zoom control to the digital still camera 1, through the communication control processing block 71.

FIG. 22 is a diagram illustrating a configuration example of another modified example of the imaging system according to the embodiment of the invention. In the figure, the same elements as in FIG. 21 are given the same reference numerals, and thus, a description thereof will be omitted.

In this system, an imaging section 75 is provided in the camera platform 10. The imaging section 75 includes an optical system and an imaging element (imager) for imaging, and a signal processing section configured to obtain a signal (imaging signal) based on the imaging light and to generate a captured image signal data from the imaging signal. This configuration corresponds to a section which is formed with a signal processing stage until the captured image data is obtained in the optical system 21, the image sensor 22, the A/D converter 23 and the signal processing section 24 as shown in FIG. 6. The captured image data which is generated by the imaging section 75 is output to the subject detection processing block 73. Further, the direction (imaging direction) in which the imaging light is imported by the imaging section 75 is set, if at all possible, to coincide with the imaging direction of the optical system 21 (lens section 3) of the digital still camera 1 which is mounted on the camera platform 10.

In this case, the subject detection processing block 73 and the composition control processing block 74 performs the subject detection process and the composition control process in a similar to the case in FIG. 21. However, in this case, the composition control processing block 74 transmits a release instruction signal to the digital still camera 1 from the communication control processing block 71, with respect to the timing for performing a release operation, in addition to the pan-tilt control. In the digital still camera 1, the release operation is performed according to the received release instruction signal.

In this way, in the another modified example, with respect to the subject detection process and the composition control, all controls and processes other than the release operation itself can be completely performed in the camera platform 10.

Further, the pan control and the tilt control which are performed in the composition controls according to the present embodiment as described above can be performed by controlling the movement of the pan-tilt mechanism of the camera platform 10, but instead of the camera platform 10, for example, a composition may be employed in which the imaging light which is reflected by a reflective mirror is incident to the lens section 3 of the digital still camera 1, and the reflected light is moved so that the panning and tilting result with respect to an image obtained on the basis of the imaging light can be obtained.

Further, even though the control is performed so that the pixel area for importing a valid imaging signal as an image from the image sensor 22 of the digital still camera 1 is shifted in the horizontal direction and the vertical direction, a result equivalent to the case where the panning and tilting is performed can be obtained. In this case, it is not necessary to provide the camera platform 10 or a pan-tilt device other than the digital still camera 1 which is similar to the camera platform 10, and the composition control according to the present embodiment can be completely performed by a single device of the digital still camera 1.

Alternatively, by providing a mechanism capable of changing the optical axis of the lens in the optical system 21 in the horizontal and vertical directions and controlling the movement of the mechanism, the panning and the tilting can be performed.

Further, the algorithm for determining the parameters including the target horizontal offset amount $\Delta x$, the target vertical offset amount $\Delta y$ and the zoom magnification Z is not limited to the example described thus far. For example, these parameters may be varied according to the number of the detected individual subjects. Further, attributes such as genders and ages of persons which are the individual subjects may be detected, and then, the parameters may be varied on the basis of the detection result. In addition, an individual person may be recognized for every individual subject, and then, the parameters may be varied on the basis of the recognized individual person.

Furthermore, in the above description, the imaging system according to the present embodiments includes the digital still camera 1 and the camera platform 10 which are provided as separated bodies, but may include an imaging device which is integrally provided with an imaging device section and a movable mechanism section corresponding to the camera platform.

Further, in the above described embodiments, it is assumed that the subject (individual subject) is a person, but the present invention can be applied to a case where the subject is, for example, an animal other than the person.

In addition, the image data which is a subject detection target is not limited to image data (captured image data) which is obtained by the imaging, but for example, image data having image contents such as a painting or design drawing can be used as the subject target.

Furthermore, the composition (optimal composition) determined according to the invention is not necessarily limited to a composition which is determined by a technique in which a factor of the number of the detected individual subjects is added, with respect to the composition setting technique such as a three-part division. For example, in the case of a composition which is generally considered as bad, after the composition is set, a user may feel interesting or rather good from the composition. Accordingly, the composition (optimal composition) determined according to the invention may be preferably set in an arbitrary manner in consideration of utility, entertainment influence or the like, and actually, is not limited to a specific composition.

The present application contains subject matter related to that disclosed in Japanese Priority Patent Application JP 2009-174575 filed in the Japan Patent Office on Jul. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A composition control device comprising:
    composition determination means which is configured to determine a target composition on the basis of information about a subject detected from an image captured and obtained by an imaging section, the composition determination means determining zoom magnification for obtaining the target composition and a target position of the subject in an image region for obtaining the target composition, the target position of the subject obtained as a horizontal movement target amount in a horizontal direction with reference to a reference position in the image corresponding to an imaging optical axis of the imaging section and a vertical movement target amount in a vertical direction with reference to the reference position;
    preliminary position obtaining means which is configured to obtain, as a preliminary position, a position of the subject obtained in the image, the preliminary position obtained as a control horizontal movement amount calculated as a function of the horizontal movement target amount and the zoom magnification and a control vertical movement amount calculated as a function of the vertical movement target amount and the zoom magnification, before a field angle is changed according to the zoom magnification, in a case where the target position determined by the composition determination means is obtained; and
    zoom control means which is configured to perform a driving control for a zoom lens of the imaging section so that the field angle is obtained according to the zoom magnification determined by the composition determination means after the image region of the subject is disposed in the preliminary position by means of a movable mechanism section control which is configured to perform a control for a movable mechanism section which is configured to change an imaging view range of the imaging section so that the position of the subject in the image region corresponds to the obtained preliminary position, wherein, after the image region of the subject is disposed at the preliminary position, the target position and zoom magnification are redetermined upon determination that the image region of the subject disposed at the preliminary position does not correspond to the target position.

2. The composition control device according to claim 1, wherein the movable mechanism section control means controls the movable mechanism section so that the center of gravity set in the subject is positioned in the x coordinate which is determined according to the control horizontal movement amount and in the y coordinate which is determined according to the control vertical movement amount.

3. The composition control device according to claim 2, wherein the imaging section includes the composition determination means, the preliminary position obtaining means, the movable mechanism section control means and the zoom control means, and wherein the movable mechanism section control means controls the movable mechanism section, which is provided as a separate body with respect to the imaging section, through communication with respect to the movable mechanism section.

4. The composition control device according to claim 2, wherein a movable mechanism device including the movable mechanism section is provided as a separate body with respect to the imaging section, and at least includes an input means through which image data output from the imaging section is input, the composition determination means, the preliminary position obtaining means and the movable mechanism section control means.

5. An imaging system comprising:
    an imaging device;
    a movable mechanism device including a mechanism which is movable to change an imaging view range of the imaging device;
    composition determination means which is configured to determine a target composition on the basis of information about a subject detected from an image captured and obtained by the imaging device, the composition determination means determining zoom magnification for obtaining the target composition and a target position of the subject in an image region for obtaining the target composition, the target position of the subject obtained as a horizontal movement target amount in a horizontal direction with reference to a reference position in the image corresponding to an imaging optical axis of the imaging section and a vertical movement target amount in a vertical direction with reference to the reference position;
    preliminary position obtaining means which is configured to obtain, as a preliminary position, a position of the subject obtained in the image, the preliminary position obtained as a control horizontal movement amount calculated as a function of the horizontal movement target amount and the zoom magnification and a control vertical movement amount calculated as a function of the vertical movement target amount and the zoom magnification, before a field angle is changed according to the zoom magnification, in a case where the target position determined by the composition determination means is obtained; and
    zoom control means which is configured to perform a driving control for a zoom lens of the imaging device so that the field angle is obtained according to the zoom magnification determined by the composition determination means after the image region of the subject is disposed in the preliminary position by means of movable mechanism device control means which is configured to perform a control for the movable mechanism device so that the position of the subject in the image region corresponds to the obtained preliminary position, wherein, after the image region of the subject is disposed at the preliminary position, the target position and zoom magnification are redetermined upon determination that the image region of the subject disposed at the preliminary position does not correspond to the target position.

6. The imaging system according to claim 5, wherein the composition determination means, the preliminary position obtaining means, the movable mechanism device control means and the zoom control means are provided in the imaging device, and
wherein the movable mechanism device control means controls the movable mechanism device through communication with respect to the movable mechanism device.

7. A composition control method comprising the steps of:
determining a target composition on the basis of information about a subject detected from an image captured and obtained by an imaging section, the composition determining step determining zoom magnification for obtaining the target composition and a target position of the subject in an image region for obtaining the target composition, the target position of the subject obtained as a horizontal movement target amount in a horizontal direction with reference to a reference position in the image corresponding to an imaging optical axis of the imaging section and a vertical movement target amount in a vertical direction with reference to the reference position;
obtaining, as a preliminary position, a position of the subject obtained in the image, the preliminary position obtained as a control horizontal movement amount calculated as a function of the horizontal movement target amount and the zoom magnification and a control vertical movement amount calculated as a function of the vertical movement target amount and the zoom magnification, before a field angle is changed according to the zoom magnification, in a case where the target position determined by the composition determining step is obtained; and
performing a driving control for a zoom lens of the imaging section so that the field angle is obtained according to the zoom magnification determined by the composition determining step after the image region of the subject is disposed in the preliminary position by means of the step of performing a control for a movable mechanism section which is configured to change an imaging view range of the imaging section so that the position of the subject in the image region corresponds to the obtained preliminary position, wherein, after the image region of the subject is disposed at the preliminary position, the target position and zoom magnification are redetermined upon determination that the image region of the subject disposed at the preliminary position does not correspond to the target position.

8. A non-transitory computer readable storage medium having instructions stored therein, which when executed by a processor causes the processor to execute a method comprising:
determining a target composition on the basis of information about a subject detected from an image captured and obtained by an imaging section, the composition determining step determining zoom magnification for obtaining the target composition and a target position of the subject in an image region for obtaining the target composition, the target position of the subject obtained as a horizontal movement target amount in a horizontal direction with reference to a reference position in the image corresponding to an imaging optical axis of the imaging section and a vertical movement target amount in a vertical direction with reference to the reference position;
obtaining, as a preliminary position, a position of the subject obtained in the image, the preliminary position obtained as a control horizontal movement amount calculated as a function of the horizontal movement target amount and the zoom magnification and a control vertical movement amount calculated as a function of the vertical movement target amount and the zoom magnification, before a field angle is changed according to the zoom magnification, in a case where the target position determined by the composition determining step is obtained; and
performing a driving control for a zoom lens of the imaging section so that the field angle is obtained according to the zoom magnification determined by the composition determining step after the image region of the subject is disposed in the preliminary position by means of the step of performing a control for a movable mechanism section which is configured to change an imaging view range of the imaging section so that the position of the subject in the image region corresponds to the obtained preliminary position, wherein, after the image region of the subject is disposed at the preliminary position, the target position and zoom magnification are redetermined upon determination that the image region of the subject disposed at the preliminary position does not correspond to the target position.

9. A composition control device comprising:
a composition determination unit which is configured to determine a target composition on the basis of information about a subject detected from an image captured and obtained by an imaging section, the composition determination unit determining zoom magnification for obtaining the target composition and a target position of the subject in an image region for obtaining the target composition, the target position of the subject obtained as a horizontal movement target amount in a horizontal direction with reference to a reference position in the image corresponding to an imaging optical axis of the imaging section and a vertical movement target amount in a vertical direction with reference to the reference position;
a preliminary position obtaining unit which is configured to obtain, as a preliminary position, a position of the subject obtained in the image, the preliminary position obtained as a control horizontal movement amount calculated as a function of the horizontal movement target amount and the zoom magnification and a control vertical movement amount calculated as a function of the vertical movement target amount and the zoom magnification, before a field angle is changed according to the zoom magnification, in a case where the target position determined by the composition determination unit is obtained; and
a zoom control unit which is configured to perform a driving control for a zoom lens of the imaging section so that the field angle is obtained according to the zoom magnification determined by the composition determination unit after the image region of the subject is disposed in the preliminary position by means of a movable mechanism section control unit which is configured to perform a control for a movable mechanism section which is configured to change an imaging view range of the imaging section so that the position of the subject in the image region corresponds to the obtained preliminary position, wherein, after the image region of the subject is disposed at the preliminary position, the target position and zoom magnification are redetermined upon determination that the image region of the subject disposed at the preliminary position does not correspond to the target position.

10. An imaging system comprising:

an imaging device;

a movable mechanism device including a mechanism section which is movable to change an imaging view range of the imaging device;

a composition determination unit which is configured to determine a target composition on the basis of information about a subject detected from an image captured and obtained by the imaging device, the composition determination unit determining zoom magnification for obtaining the target composition and a target position of the subject in an image region for obtaining the target composition, the target position of the subject obtained as a horizontal movement target amount in a horizontal direction with reference to a reference position in the image corresponding to an imaging optical axis of the imaging section and a vertical movement target amount in a vertical direction with reference to the reference position;

a preliminary position obtaining unit which is configured to obtain, as a preliminary position, a position of the subject obtained in the image, the preliminary position obtained as a control horizontal movement amount calculated as a function of the horizontal movement target amount and the zoom magnification and a control vertical movement amount calculated as a function of the vertical movement target amount and the zoom magnification, before a field angle is changed according to the zoom magnification, in a case where the target position determined by the composition determination unit is obtained; and a zoom control unit which is configured to perform a driving control for a zoom lens of the imaging device so that the field angle is obtained according to the zoom magnification determined by the composition determination unit after the image region of the subject is disposed in the preliminary position by means of a movable mechanism device control unit which is configured to perform a control for the movable mechanism device so that the position of the subject in the image region corresponds to the obtained preliminary position, wherein, after the image region of the subject is disposed at the preliminary position, the target position and zoom magnification are redetermined upon determination that the image region of the subject disposed at the preliminary position does not correspond to the target position.

* * * * *